United States Patent
Matsumoto et al.

(10) Patent No.: US 6,708,541 B1
(45) Date of Patent: Mar. 23, 2004

(54) METHOD AND APPARATUS FOR MEASURING ANGLE OF BEND, METHOD OF BENDING, AND APPARATUS FOR CONTROLLING ANGLE OF BEND

(76) Inventors: Masateru Matsumoto, 5-11-1, Okada, Atsugi-shi, Kanagawa 243-0021 (JP); Kazuyuki Uchida, 2-21-3, Kokubukita, Ebina-shi, Kanagawa 243-0406 (JP); Kenichi Tsuchiura, 150-5, Maekawa, Odawara-shi, Kanagawa 256-0813 (JP); Takayuki Aoki, 2-438, Marukodoori, Nakahara-ku, Kawasaki-shi, Kanagawa 211-0006 (JP)

( * ) Notice: Subject to any disclaimer, the term of this patent is extended or adjusted under 35 U.S.C. 154(b) by 0 days.

(21) Appl. No.: 09/744,957
(22) PCT Filed: Aug. 9, 1999
(86) PCT No.: PCT/JP99/04305
§ 371 (c)(1), (2), (4) Date: Feb. 8, 2001
(87) PCT Pub. No.: WO00/09275
PCT Pub. Date: Feb. 24, 2000

(30) Foreign Application Priority Data

Aug. 10, 1998 (JP) .............................. 10-226185
Aug. 14, 1998 (JP) .............................. 10-229849

(51) Int. Cl.⁷ .............................. B21D 7/14; B21D 5/08; G06F 15/46
(52) U.S. Cl. .................. 72/31.1; 72/31.11; 72/389.3; 72/389.5; 72/702
(58) Field of Search .................. 72/389.3, 389.5, 72/31.1, 31.11, 702

(56) References Cited

U.S. PATENT DOCUMENTS 4,864,509 A * 9/1989 Somerville et al. ........ 72/389.3
5,839,310 A * 11/1998 Tokai et al. .................. 72/31.1
6,161,408 A * 12/2000 Ooenoki et al. ............. 72/31.1

FOREIGN PATENT DOCUMENTS

| JP | 7-116737 | 5/1995 |
| JP | 7-314042 | 12/1995 |
| JP | 10305391 | 11/1998 |

OTHER PUBLICATIONS

English Language Abstract of JP 10–305391.
English Language Abstract of JP 7–116737.
English Language Abstract of JP 7–314042.

* cited by examiner

Primary Examiner—David Jones
(74) Attorney, Agent, or Firm—Greenblum & Bernstein, P.L.C.

(57) ABSTRACT

An angle detecting head provided with an emitter and a pair of receivers is rocked, and a bent surface of a workpiece bent by a punch and a die of a bending machine is irradiated with a measurement light from the emitter, a reflected light is received by the pair of receivers, and a bending angle of the workpiece is obtained from a peak value of the light received by the respective receivers. The angle detecting head is movable parallel to the die, is movable in a direction close to and away from the workpiece, and is movable in a direction in which the die is raised/lowered. The angle detecting head is positioned in an optimum angle measurement position of the workpiece and the bending angle is measured. Moreover, the bending machine presses the workpiece to the vicinity of a target angle, measures the bending angle of the workpiece during final pressing, removes pressure to bring the workpiece to an unloaded state, measures the bending angle of the workpiece, and obtains and stores a difference between the final pressing angle measured value and the unloaded angle measured value as a spring-back amount.

26 Claims, 21 Drawing Sheets

FIG.17
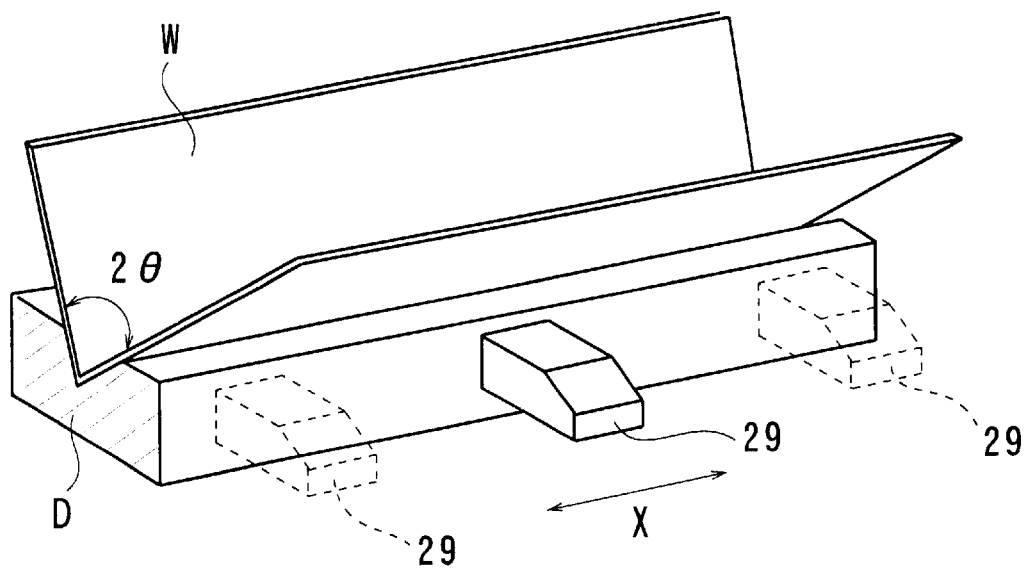
FIG.18A
FIG.18B
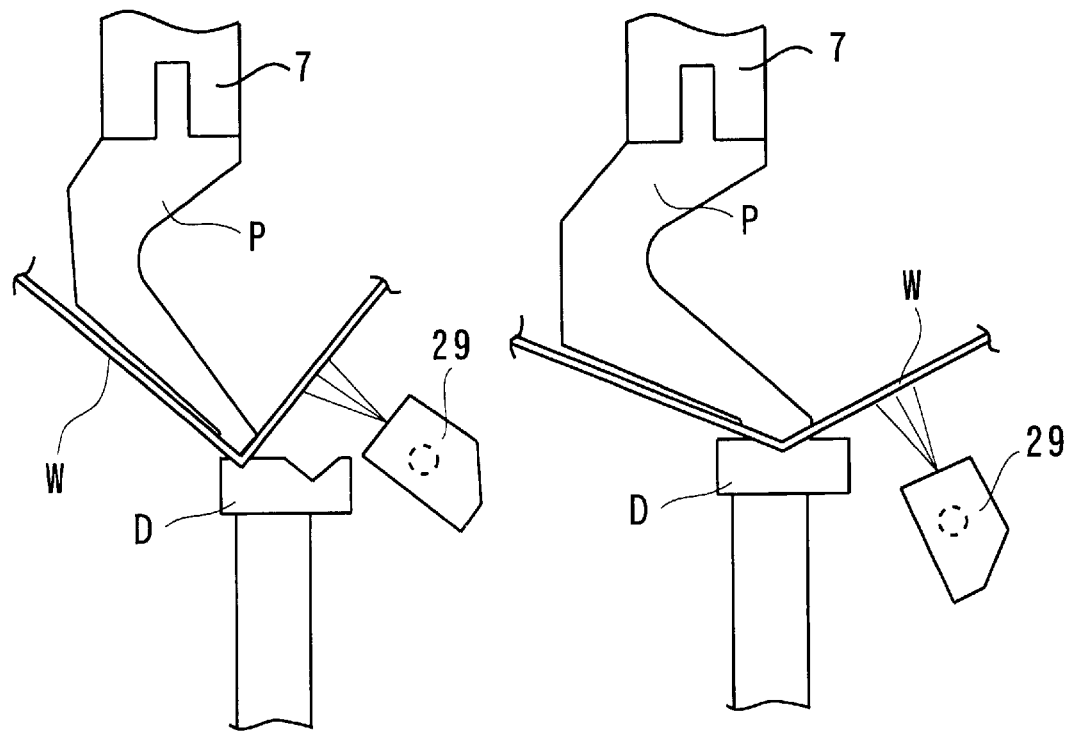

METHOD AND APPARATUS FOR MEASURING ANGLE OF BEND, METHOD OF BENDING, AND APPARATUS FOR CONTROLLING ANGLE OF BEND

TECHNICAL FIELD

The present invention relates to a bending angle measuring method and apparatus, and a bending method and bending angle controller utilizing the above bending angle measuring method and apparatus. More specifically, the present invention relates to a bending angle measuring method and apparatus in which an accurate bending angle can be measured by moving and positioning an angle detecting head to a portion suitable for measuring a bending angle. Particularly, the present invention relates to a bending method and bending angle controller in which a desired bending angle can be obtained accurately in consideration of a spring back amount in a bending process.

BACKGROUND ART

In general, in a bending machine such as a press brake provided with an NC device, driving mechanisms for a table drive shaft are disposed on both of right and left sides, respectively, and the NC device controls the respective driving mechanisms based on a depth value (D value) corresponding to a target angle to bend a workpiece to the vicinity of the target angle.

Here, the D value is a distance (i.e., distance between blades) between a punch and a die which corresponds to the target angle, and it is, in other words, a pressing stroke amount of a table which corresponds to the target angle. Moreover, the NC device can be classified into a type in which an operator directly inputs and sets the D value, and a type in which the operator only inputs the target angle and the NC device calculates and sets the corresponding D value based on the target angle.

In either type, if necessary, the operator operates a hand pulser (a pulse generator for manual operation) to finish (increase a bend of) the bent workpiece, so that a finished angle is placed within an allowable range.

In the bending machine, the workpiece whose bending process has ended is removed from the bending machine, and then spring-back inevitably occurs. Moreover, a bending angle spread by spring-back is the finished angle of the workpiece.

Therefore, during an actual bending process, instead of setting an angle to be originally finished as the target angle, the target angle needs to be set in consideration of the spring-back amount. For this purpose, it is necessary to grasp, in advance, the spring-back amount which is to be generated in the workpiece as a bending object.

In a conventional art, the operator uses the workpiece to first try bending the workpiece, and the spring-back amount is measured from the workpiece.

However, when considering conditions for accurately measuring the spring-back amount [(I) Pressing of the workpiece by NC is accurately performed until the target angle is obtained. (II) The bending angle of the workpiece during final pressing is accurately measured. (III) After applied pressure is removed, the bending angle of the workpiece in a completely unloaded state is accurately measured.], in a conventional method, it is difficult for operators other than experienced operators to accurately obtain the spring-back amount by performing an operation once or twice. Moreover, even when trying bending the workpiece many times, the spring-back amount is not necessarily accurately obtained. Therefore, in practice, it is considerably difficult to grasp the accurate spring-back amount beforehand, and set the target angle with the spring-back amount considered therein as the target angle. As a result, there is a problem that it is difficult to enhance a finishing precision of the workpiece.

On the other hand, the present applicant has proposed a so-called non-contact type bending angle measuring method and measurement apparatus in which the workpiece bent by the bending machine is irradiated with a laser light and a returned light is detected to measure the bending angle.

FIG. 1 shows one example of the non-contact type bending angle measurement apparatus proposed by the present applicant. As shown in FIG. 1, a bending angle measurement apparatus 507 is mounted on a bending machine 505 in which a punch P disposed on an upper table 501 and a die D disposed on a lower table 503 cooperate to bend a workpiece W to a desired angle, so that the bending angle can be measured immediately after the bending process without removing the workpiece W from the bending machine 505.

As shown in FIGS. 1 and 2, the bending angle measurement apparatus 507 is constituted of a bracket 511 movable along a guide rail 509 extending parallel to the die D on the front surface of the lower table 503, and a detecting head 513 attached to the bracket 511. As shown in FIG. 2, the detecting head 513 is provided with a projector for irradiating the workpiece W with the laser light, and a pair of receivers for receiving the light reflected by the workpiece W, and the detecting head can rock centering on a rotation center Po in a certain angle range.

That is to say, as shown in FIG. 3, the detecting head 513 is rocked by a stepping motor 519 attached to a common shaft 517. Additionally, an encoder 521 is attached to the shaft 517 on a side of the stepping motor 519 opposite to a side thereof on which the detecting head 513 is located.

In the bending angle measurement apparatus 507, the workpiece W is irradiated with the laser light from the projector while the detecting head 513 is vertically rocked. The bending angle of the workpiece W is detected from a peak value of an amount of the light received by the pair of receivers, or a rotation angle of the detecting head 513 corresponding to a gravity center position obtained from an area of a peak waveform. Concretely, for a bending angle 2θ of the workpiece W, as shown in FIG. 4, respective peak values θ1, θ2 of a point at which the reflected light is received by the pair of receivers are measured, and the bending angle is obtained from the peak values θ1, θ2. That is to say, the bending angle is calculated as 2θ=(θ1+θ2). Additionally, FIG. 4 shows a case in which the bending angle is 90 degrees, the abscissa shows the angle by the encoder 521, and the ordinate shows the received light amount.

Additionally, shapes of the workpieces W to be bent/worked have different bending widths, and are various. Additionally, the bending angle broadly ranges from an acute angle to an obtuse angle. Therefore, in order to accurately measure the bending angle, the detecting head 513 needs to be brought as close to a bent portion as possible. That is to say, the bending angle increases toward a tip end of a bent side because of an influences of sag or deflection of the workpiece W and an aimed angle cannot be obtained. Therefore, to measure the angle of the bent portion is most reliable.

However, the angle detecting head 513 constituted as described above rotatably rocks centering on the point Po as the rotation center with respect to the workpiece W, and can only move parallel to the die D along the guide rail 509. Therefore, for a workpiece W bent at an acute angle or a workpiece W bent in a complicated manner, the detecting head 513 cannot be brought close to the bent portion. Particularly, with a workpiece W which interferes with the angle detecting head 513, or a workpiece W which has a hole or a molded material, when the angle detecting head 513 is simply moved parallel to the die D, it is difficult to set the angle detecting head 513 in a predetermined angle detection position. Therefore, the bending angle measurement apparatus 507 constituted as described above cannot detect the accurate bending angle.

Consequently, in order to detect the bending angles of the workpieces having different bending widths and various shapes with a good precision, it is necessary to bring the angle detecting head close to the bent portion of the workpiece.

DISCLOSURE OF INVENTION

An object of the present invention is to solve the aforementioned problems of the conventional art, and provide a workpiece bending method and bending angle controller which can accurately measure a spring-back amount of a workpiece in a bending process, and effectively utilize the measured spring-back amount, so that a finishing precision of the workpiece can be enhanced.

Another object of the present invention is to provide a workpiece bending method and bending angle controller which can accurately measure a spring-back amount of a workpiece in a bending process, effectively utilize the measured spring-back amount, thereby enhance a finishing precision of the workpiece, and which can easily be applied to a bending machine provided with a conventional NC device.

Further object of the present invention is to provide a bending angle measuring method and apparatus which can move an angle detecting head to a portion suitable for measuring a bending angle, position the angle detecting head in the portion, and which can measure an accurate bending angle.

To achieve the aforementioned objects, a bending angle measuring method comprises, while rocking an angle detecting head provided with an emitter and a pair of receivers, irradiating, with a measurement light from the emitter, the surface of a workpiece disposed in the vicinity of a bent position of the workpiece bent by a punch and a die of a bending machine, receiving a reflected light by the pair of receivers, and then obtaining a bending angle in a bent portion of the workpiece from a peak value of an amount of the light received by the respective receivers, wherein the angle detecting head is movable in a direction extending along a bent line of the workpiece, movable in a direction extending close to or apart from the workpiece, and movable in a direction crossing at right angles to both the moving directions, and the angle detecting head is positioned at a predetermined angle measurement position of the workpiece and the bending angle is then measured.

When the angle detecting head is movable in the four axial directions in this manner, the angle detecting head can be brought close to the bent portion even of the workpiece having any bent shape, and the bending angle of the workpiece can be detected with a high precision.

To achieve the aforementioned objects, a bending angle measurement apparatus, while rocking an angle detecting head provided with an emitter and a pair of receivers, irradiates, with a laser light from the emitter, the surface of a workpiece disposed in the vicinity of a bent position of the workpiece bent by a punch and a die of a bending machine, receives a reflected light by the pair of receivers, and then obtains a bending angle in a bent portion of the workpiece from a peak value of an amount of the light received by the respective receivers, wherein the angle detecting head is movable in a direction extending along a bent line of the workpiece, movable in a direction extending close to or apart from the workpiece, and movable in a direction crossing at right angles to both the moving directions.

To achieve the objects, a bending angle measurement apparatus comprises a rockable angle detecting head for irradiating the surface of a workpiece disposed in the vicinity of a bent position of the workpiece bent by a punch and a die of a bending machine with a laser light, receiving the reflected light by a pair of receivers, and obtaining a bending angle in a bent portion of the workpiece from a peak value of an amount of the light received by the respective receivers; means for moving the angle detecting head in a direction close to or apart from the workpiece; means for moving the angle detecting head in a direction extending along a bent line of the workpiece; and means for moving the angle detecting head in a direction crossing at right angles to both the moving directions.

To achieve the objects, a bending machine is provided with a punch attached to one table, and a die attached to the other table disposed opposite to the one table, and constituted to relatively bring the die and the punch close to each other and bend a workpiece by a predetermined bending angle by the die and the punch. In the bending machine, an angle detecting head for irradiating the surface of the workpiece disposed in the vicinity of a bent position of the workpiece with a measurement light and measuring a bending angle in a bent portion of the workpiece from a peak value of an amount of reflected and received light is set to be movable in a direction extending along a bent line of the workpiece, movable in a direction extending close to or apart from the workpiece, and movable in a direction crossing at right angles to both the moving directions.

To achieve the objects, a workpiece bending method in a bending machine comprises the steps of: pressing a workpiece to the vicinity of a target angle by a bending machine; measuring a bending angle of the workpiece during final pressing and holding a measured value; removing pressure to bring the workpiece to an unloaded state; measuring the bending angle of the workpiece in the unloaded state and holding the measured value; using the final pressing angle measured value and the unloaded angle measured value to obtain an angle difference between both the values; and registering the obtained angle difference as a spring-back amount.

In this manner, when the angle difference between the bending angle of the workpiece during final pressing and the bending angle of the workpiece in the unloaded state is registered as the spring-back amount, the spring-back amount of the workpiece in a bending process can accurately be measured, and further the measured spring-back amount can effectively be utilized.

To achieve the objects, a workpiece bending method comprises, in a bending machine provided with an NC device, the steps of pressing a workpiece to the vicinity of a target angle by the NC device; measuring the bending angle of the workpiece during final pressing and holding a measured value; removing the workpiece from the bending machine to bring the workpiece to an unloaded state; measuring the bending angle of the workpiece in the unloaded state and holding the measured value; using the final pressing angle measured value and the unloaded angle measured value to obtain an angle difference between both the values; and registering the obtained angle difference as a spring-back amount.

In this manner, when the bending angle of the workpiece during final pressing by the NC device is measured, then the bending angle of the workpiece brought to the unloaded state is measured, and the difference between both the angles is registered as the spring-back amount, the spring-back amount of the workpiece in the bending process can accurately be measured, and the measured spring-back amount can effectively be utilized.

To achieve the objects, a workpiece bending method comprises, in a bending machine provided with an NC device, a step of disposing follow-up control means, and setting a target angle in the follow-up control means; a step of setting a D value corresponding to a tentative bending angle wider than the target angle in the NC device; a step of pressing the workpiece to bend the workpiece to the vicinity of the tentative bending angle by the NC device; a step of measuring the bending angle of the workpiece during finishing of tentative bending; a follow-up step of transmitting a necessary number of pulses for executing an automatic follow-up operation to the NC device from the follow-up control means based on an angle error between an angle measured value and the target angle, and driving the workpiece to the target angle; a final pressing angle measuring step of measuring the bending angle of the workpiece during final follow-up; a step of removing pressure to bring the workpiece to an unloaded state; an unloaded angle measuring step of measuring the bending angle of the workpiece in the unloaded state; a step of obtaining a spring-back amount of the workpiece from a difference between the final pressing angle measured value and the unloaded angle measured value; and a step of registering the obtained spring-back amount.

When the bending angle of the workpiece is measured during final follow-up, then the bending angle of the workpiece brought to the unloaded state is measured, and the spring-back amount is obtained from the difference between these angles and registered, the spring-back amount in the bending process can accurately be measured, and the measured spring-back amount can effectively be utilized.

In an embodiment, in the follow-up step, the angle error is converted to the corresponding D value, and the number of pulses corresponding to the D value are transferred to the NC device.

In another embodiment, in the follow-up step, a predetermined number of pulses are first transferred as an initial value to the NC device to execute an initial follow-up operation, a necessary number of pulses for executing a remaining follow-up operation are calculated based on a result of the initial follow-up operation, and the calculated number of pulses are transferred to the NC device.

In yet another embodiment, the follow-up step comprises a step of converting the angle error to the corresponding D value; a step of transferring a predetermined number of pulses as an initial value to the NC device to execute an initial follow-up operation; a step of measuring the bending angle of the workpiece during finishing of the initial follow-up operation; a step of obtaining the D value per pulse from an angle measured value of a point at which the initial follow-up operation is finished, and the pulse number as the initial value, and obtaining a remaining D value based on the obtained D value; and a step of transferring the number of pulses corresponding to the obtained remaining D value to the NC device and executing a remaining follow-up operation to drive the workpiece to the target angle.

In still another embodiment, while the follow-up operation is being executed, a follow-up operation sound for informing an operator that the follow-up operation is being executed is generated.

In another embodiment, in the final pressing angle measuring step and the unloaded angle measuring step, the measured angle is held in a memory.

In yet another embodiment, in the step of setting the D value, on inputting the tentative bending angle, the inputted bending angle is converted to the D value.

In additional embodiments, the final pressing angle is measured in non-contact with the workpiece, and the unloaded angle is measured in contact with the workpiece.

Moreover, to achieve the objects, a workpiece bending method comprises, in a bending machine provided with an NC device and a pulse generator for manual follow-up, a step of disposing follow-up measurement means, and setting a target angle in the follow-up measurement means; a step of setting a D value corresponding to a tentative bending angle wider than the target angle in the NC device; a step of pressing the workpiece to bend the workpiece to the vicinity of the tentative bending angle by the NC device; a step of measuring the bending angle of the workpiece by the follow-up measurement means during a manual follow-up operation of the pulse generator after tentative bending, and displaying the measured value; a step of holding the measured angle as a final pressing angle measured value by the follow-up measurement means when the angle measured value reaches the target angle; a step of removing pressure to bring the workpiece to an unloaded state; a step of measuring the bending angle of the workpiece in the unloaded state and holding the measured value; a step of using the final pressing angle measured value and the unloaded angle measured value to obtain a spring-back amount of the workpiece; and a step of registering the obtained spring-back amount.

When the bending angle of the workpiece is measured and displayed during the manual follow-up operation subsequent to the tentative bending, the final pressing angle measured value is held, the workpiece is brought to the unloaded state, the unloaded angle measured value is held, and the spring-back amount obtained from both values is registered, the spring-back amount of the workpiece in the bending process can accurately be measured, and the measured spring-back amount can effectively be utilized.

In another embodiment, when the angle measured value reaches the target angle by execution of the manual follow-up operation, a follow-up end sound for informing an operator that the angle measured value reaches the target angle is generated.

In still another embodiment, in the step of setting the D value, on inputting the tentative bending angle, the inputted tentative bending angle is converted to the D value.

In another embodiment, the final pressing angle is measured in non-contact with the workpiece, and the unloaded angle is measured in contact with the workpiece.

Moreover, to achieve the objects, a bending angle controller comprises, in a bending machine provided with an NC device, operation means to which a target angle is set; pulse generation means for generating a necessary number of pulses for executing an automatic follow-up operation to drive the workpiece to the target angle in the NC device, after bending the workpiece to the vicinity of a tentative bending angle by the NC device to which a D value corresponding to the tentative bending angle wider than the target angle is set; pressing angle measurement means for measuring an angle, when the bending angle of the workpiece reaches the angle corresponding to the target angle by execution of an automatic follow-up operation by the NC device with the pulses transferred from the pulse generation means; unloaded angle measurement means for measuring the bending angle of the workpiece brought to an unloaded state by removing pressure; and control means for obtaining and registering a spring-back amount from a difference between a final pressing angle measured value of the workpiece by the pressing angle measurement means, and an unloaded angle measured value of the workpiece by the unloaded angle measurement means.

When the pressing angle measurement means measures the final pressing angle of the workpiece, the unloaded angle measurement means measures the unloaded angle of the workpiece, and the control means obtains and registers the spring-back amount from the difference between both angles in this manner, the spring-back amount in the bending process can precisely be measured, and the measured spring-back amount can effectively be utilized.

In another embodiment the pressing angle measurement means measures the bending angle of the workpiece during finishing of tentative bending by the NC device, and the control means allows the pulse generation means to generate the necessary number of pulses for allowing the NC device to execute the automatic follow-up operation based on an angle error between the angle measured value and target angle.

In yet another embodiment, the control means converts the angle error to the corresponding D value, and allows the pulse generation means to generate the number of pulses corresponding to the D value.

In still another embodiment, the control means first allows the pulse generation means to generate a predetermined number of pulses as an initial value, allows the NC device to execute an initial follow-up operation, calculates a necessary number of pulses for executing a remaining follow-up operation based on a result of the initial follow-up operation, and allows the pulse generation means to generate the number of pulses.

In yet another embodiment, the bending angle controller can be connected to the NC device via a path for transferring the pulses to the NC device from the pulse generation means.

Moreover, to achieve the objects, a bending angle controller comprises, in a bending machine provided with an NC device and a pulse generator for manual follow-up, operation means to which a target angle is set; pressing angle measurement means for measuring a bending angle of a workpiece during a manual follow-up operation for operating the pulse generator to drive the workpiece to the target angle, after bending the workpiece to the vicinity of a tentative bending angle by the NC device to which a D value corresponding to the tentative bending angle wider than the target angle is set; means for displaying an angle measured value obtained by the pressing angle measurement means; unloaded angle measurement means for measuring the bending angle of the workpiece brought to an unloaded state by removing pressure after the manual follow-up is finished; and control means for obtaining and registering a spring-back amount from a difference between a final pressing angle measured value obtained by the pressing angle measurement means during finishing of the manual follow-up, and an unloaded angle measured value obtained by the unloaded angle measurement means.

When the control means obtains and registers the spring-back amount from the difference between the workpiece final pressing angle measured value obtained by the pressing angle measurement means during finishing of the manual follow-up, and the workpiece unloaded angle measured value obtained by the unloaded angle measurement means in this manner, the spring-back amount of the workpiece in the bending process can precisely be measured, and further the measured spring-back amount can effectively be utilized.

Moreover, to achieve the objects, a bending angle controller comprises, in a bending machine provided with an NC device and a pulse generator for manual follow-up, operation means to which a target angle is set; pulse generation means for automatic follow-up; pressing angle measurement means for measuring a bending angle of a workpiece during a follow-up operation for driving the workpiece to the target angle by the NC device based on an applied pulse, after bending the workpiece to the vicinity of a tentative bending angle by the NC device to which a D value corresponding to the tentative bending angle wider than the target angle is set; unloaded angle measurement means for measuring the bending angle of the workpiece brought to an unloaded state by removing pressure after the follow-up is finished; control means for obtaining and registering a spring-back amount from a difference between a final pressing angle measured value obtained by the pressing angle measurement means during finishing of the follow-up, and an unloaded angle measured value obtained by the unloaded angle measurement means; and changeover means for changing a generation source of the pulse applied to the NC device to the pulse generator or the pulse generation means, the controller being connectable to the NC device via the changeover means.

When the control means obtains and registers the spring-back amount from the difference between the workpiece final pressing angle measured value obtained by the pressing angle measurement means during finishing of the follow-up, and the workpiece unloaded angle measured value obtained by the unloaded angle measurement means in this manner, the spring-back amount of the workpiece in the bending process can precisely be measured, and further the measured spring-back amount can effectively be utilized. Additionally, since the bending angle controller is connected to the NC device via the changeover means for changing the pulse generator for use during manual follow-up by the operator, or the pulse generation means for use in the automatic follow-up operation, the controller can easily be connected to the existing NC device. As a result, the controller can easily be mounted on the bending machine provided with the existing NC device.

In an embodiment, when the changeover means is in a state for selecting the pulse generation means, the control means allows the pulse generation means to generate a necessary number of pulses for allowing the NC device to execute the automatic follow-up operation based on an angle error between the angle measured value obtained by the pressing angle measurement means during finishing of tentative bending and the target angle.

In another embodiment, the bending angle controller in the bending machine further comprises means for displaying the angle measured value obtained by the pressing angle measurement means, when the changeover means is in a state for selecting the pulse generator.

In still another embodiment, the final pressing angle measurement means measures the pressing angle in non-contact with the workpiece, and the unloaded angle measurement means measures the unloaded angle in contact with the workpiece.

BRIEF DESCRIPTION OF DRAWINGS

FIG. 17 is a perspective view showing a state in which the angle detecting head is moved in an X direction with respect to a continuous-length workpiece.

FIGS. 18A and 18B are sectional views showing a state in which the angle detecting head can be raised/lowered in a Z direction with respect to workpieces having different bending heights.

BEST MODE FOR CARRYING OUT THE INVENTION

An embodiment to which the present invention is applied will be described hereinafter in detail with reference to the accompanying drawings. In the present embodiment, a press brake is used as a bending machine, and the present invention is applied to the press brake.

Figure 1:
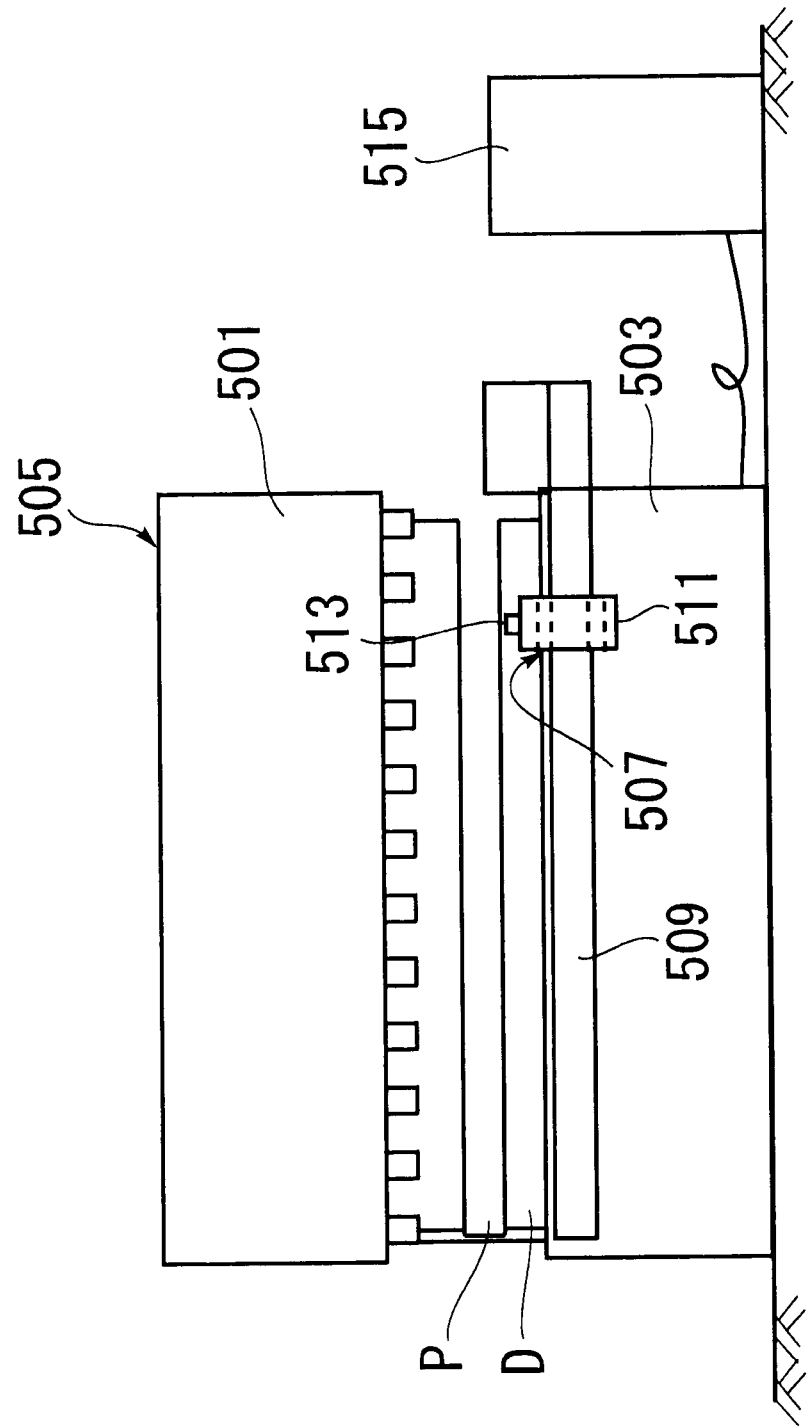
FIG. 1 is a front view of a bending machine to which a conventional bending angle measurement apparatus is attached.
Figure 2:
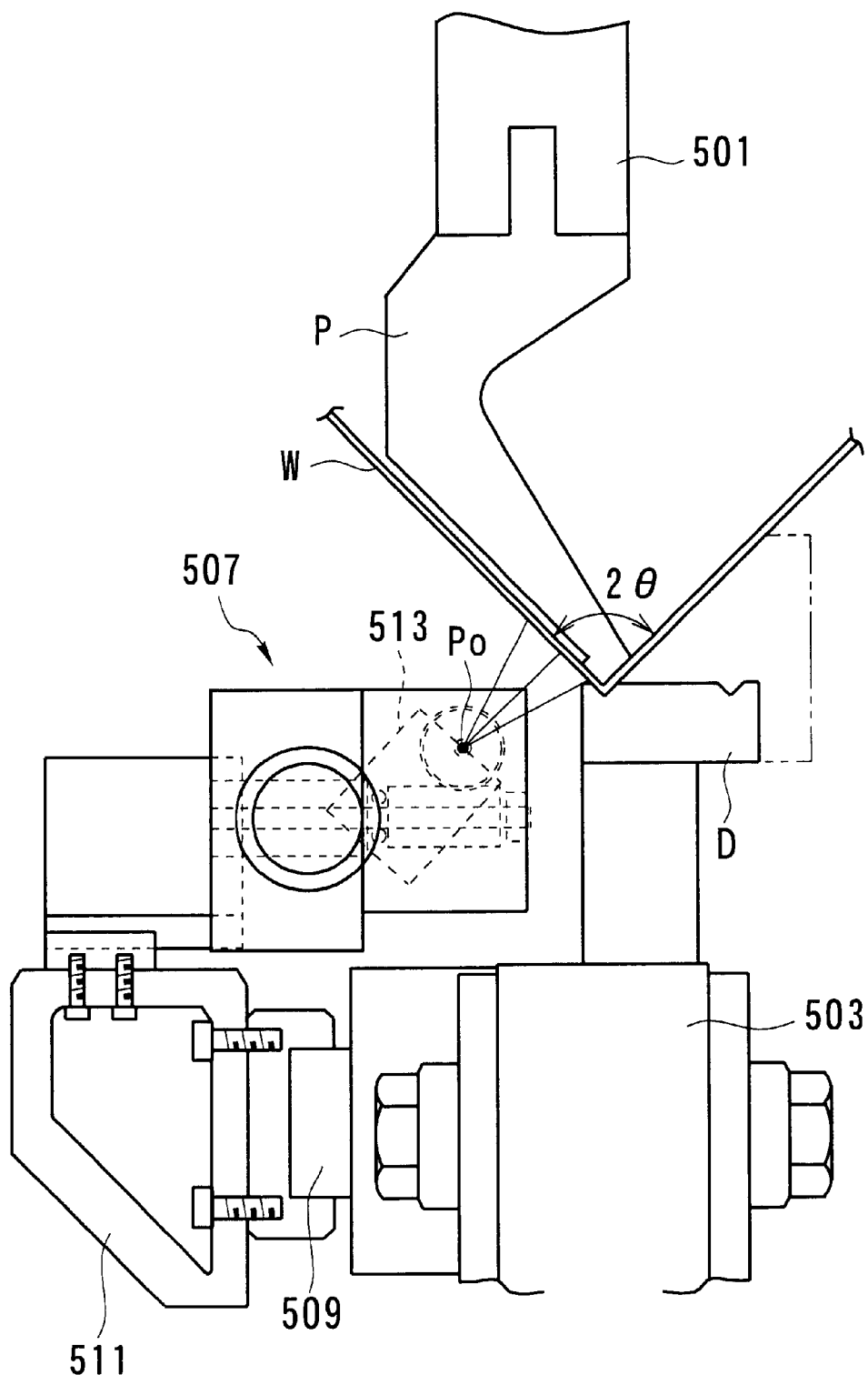
FIG. 2 is a side view showing a state in which a bending angle of a workpiece is measured by the conventional bending angle measurement apparatus.
Figure 3:
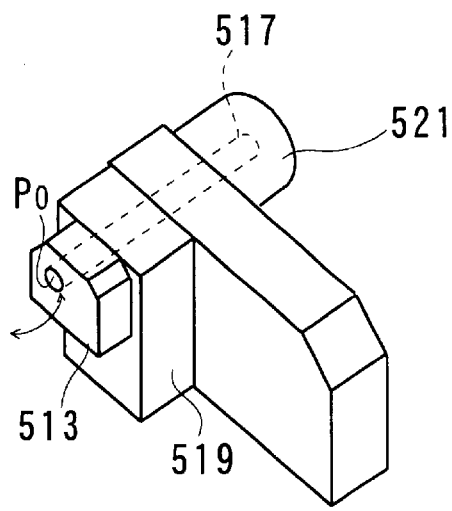
FIG. 3 is a perspective view of an angle detecting head portion.
Figure 4:
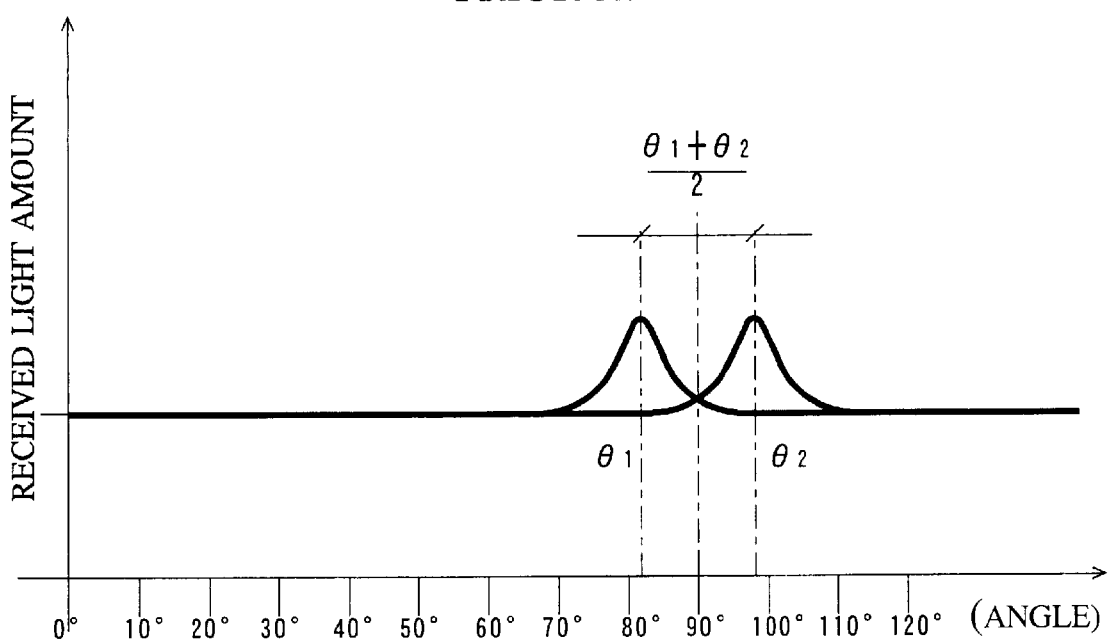
FIG. 4 is a characteristics diagram showing a relation between a received light amount and rotation angle detected by the angle detecting head disposed in the conventional bending angle measurement apparatus.
Figure 5:
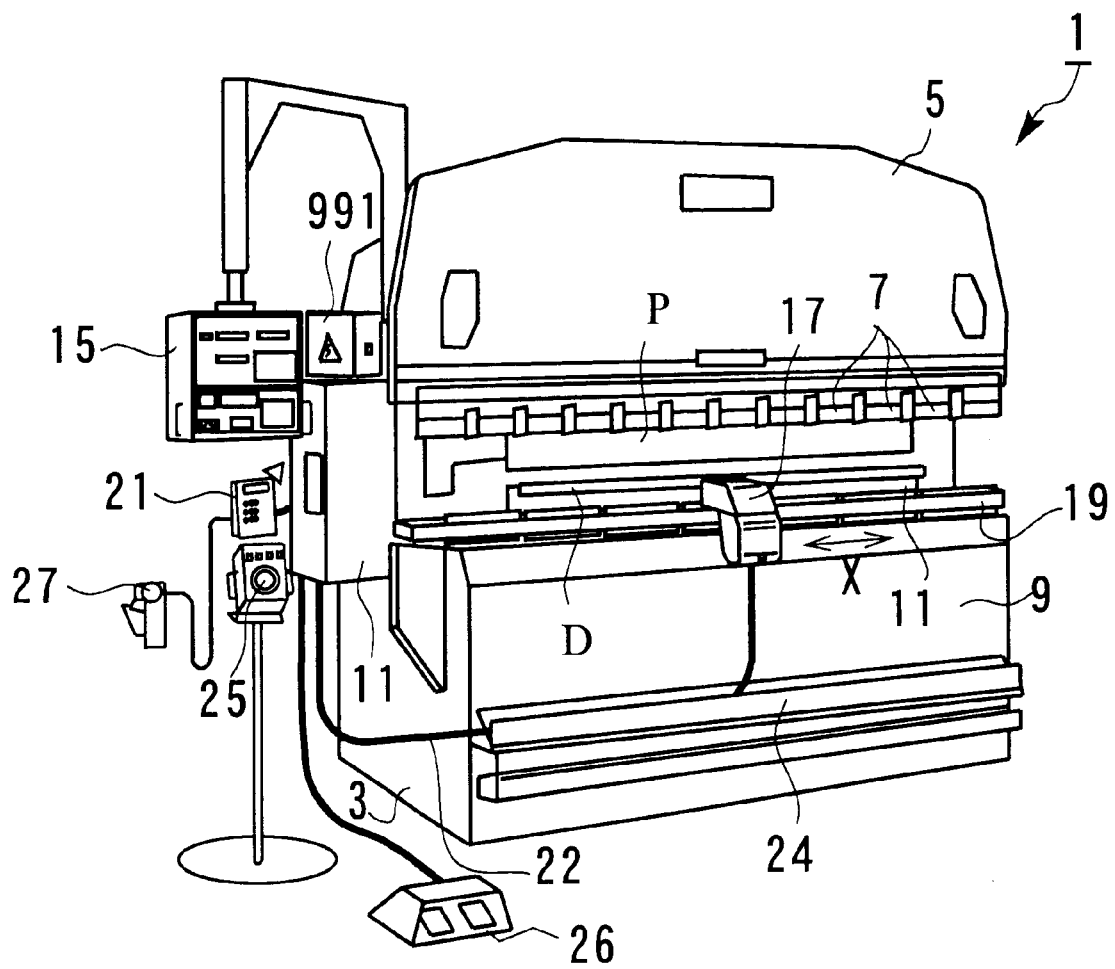
FIG. 5 is a perspective view of the bending machine to which a bending angle measurement apparatus is attached.

First, a constitution of the bending machine will briefly be described with reference to FIG. 5. A bending machine 1 shown in FIG. 5 is a press brake for linearly bending a continuous-length plate, and in the constitution a punch P cooperates with a die D to bend a workpiece set in the die D in a desired shape.

The punch P is replaceably attached to a lower end of an upper table 5 disposed on an upper front surface of a C-shaped main frame 3. Moreover, the punch P is held by a plurality of punch holders 7 in such a manner that a punch replacing operation can easily be performed, and the punch can be attached to or detached from the upper table with one touch.

On the other hand, the die D is replaceably attached to an upper end of a lower table 9 disposed on a lower front surface of the C-shaped main frame 3. The die is similarly held by a die holder 11 in such a manner that a die replacing operation can easily be performed, and the die can also be attached to or detached from the lower table with one touch.

An NC device is constituted of an NC control box 11 attached to a bending machine main body, and an NC console 15 called an NC pendant attached to extend from the bending machine in such a manner that the console can easily be operated by an operator.

Figure 7:
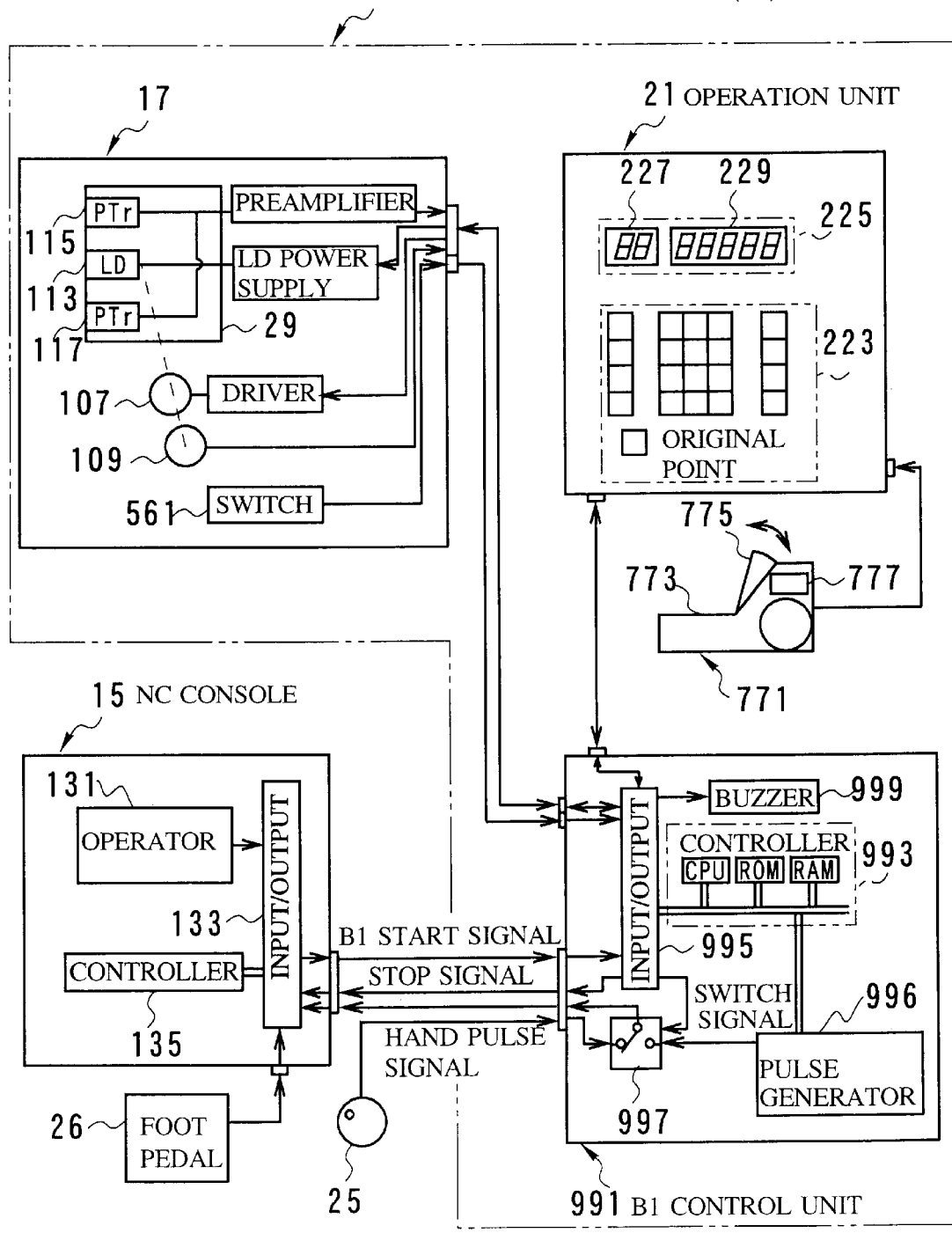
FIG. 7 is a system block diagram of the bending angle measurement apparatus.

As shown in FIG. 7, the NC console 15 is provided with: an operating section 131 including a keyboard and display for inputting and setting various attributes and bending conditions necessary for executing a bending process, such as a workpiece material, plate thickness, target angle, punch tip end R, and die width; an input/output section 133; and a controller 135 having a function of an angle/D value conversion processor for converting the set target angle to a rising stroke amount of the lower table 7, that is, a depth value (D value). Moreover, a servo unit is disposed in the NC control box 11, so that the lower table 9 is raised to a target height by a hydraulic pressure or a motor based on the calculated D value, and the workpiece is bent to the vicinity of the target angle.

The NC console 15 is also provided with a hand pulser 25 which is operated by the operator, if necessary, to finish a bent workpiece (increase a bend). The hand pulser 25 is set to raise the lower table 9, for example, at a ratio of about 0.01 mm per pulse. Furthermore, the NC console 15 is connected to a foot pedal 26 which is stepped/operated by the operator during starting/finishing the bending process.

The bending machine 1 is provided with a bending angle measurement system called a bending indicator (BI) 331. The bending indicator 331 is, as shown in FIGS. 5 and 7, provided with two types of angle measurement apparatuses: a bending angle measurement apparatus 17 for measuring a bending angle of the workpiece being pressed; and a digital rotractor 771 for measuring the bending angle of the workpiece detached from the bending machine main body. The bending indicator 331 is also provided with an operation unit 21 and a BI control unit 991, the bending angle measurement apparatus 17 is connected to the BI control unit 991, the digital protractor 771 is connected to the BI control unit 991 via the operation unit 21, and the BI control unit 991 is connected to the NC console 15.

Here, the bending angle measurement apparatus 17 of the present invention will be described in detail.

The bending angle measurement apparatus 17 is a non-contact type angle detecting indicator for irradiating the workpiece bent by the bending machine 1 with a laser light as a measurement light and detecting a return light to measure the bending angle of the workpiece.

As shown in FIG. 5, the bending angle measurement apparatus 17 is disposed so as to be movable along a guide rail 19 disposed on the upper part of the front surface of the lower table 9 in a longitudinal direction of the die and in a shown horizontal direction (X direction) parallel to the die D. Moreover, the bending angle measurement apparatus 17 is connected to the operation panel 21, so that the measured bending angle can visually and momentarily be checked as digital indication by the operator or a manager. The operation panel 21 and bending angle measurement apparatus 17 are connected via a cable 22, and the cable 22 is contained in a cable guide 24 formed by bending a plate metal in a front surface lower end of the lower table 9, so that the cable 22 does not become an obstacle.

The operation unit 21 is provided with a display for displaying the bending angle, and the like, and various input buttons. Various data for the bending process, such as a target bending angle are inputted in the operation panel 21. The various data are transferred to an NC controller connected to the operation panel 21. Additionally, the operation panel 21 is connected to a so-called digital protractor 27 for detecting a finished angle, and the digital protractor is brought in contact with a bent portion of an actually bent workpiece to measure the bending angle.

Figure 6:
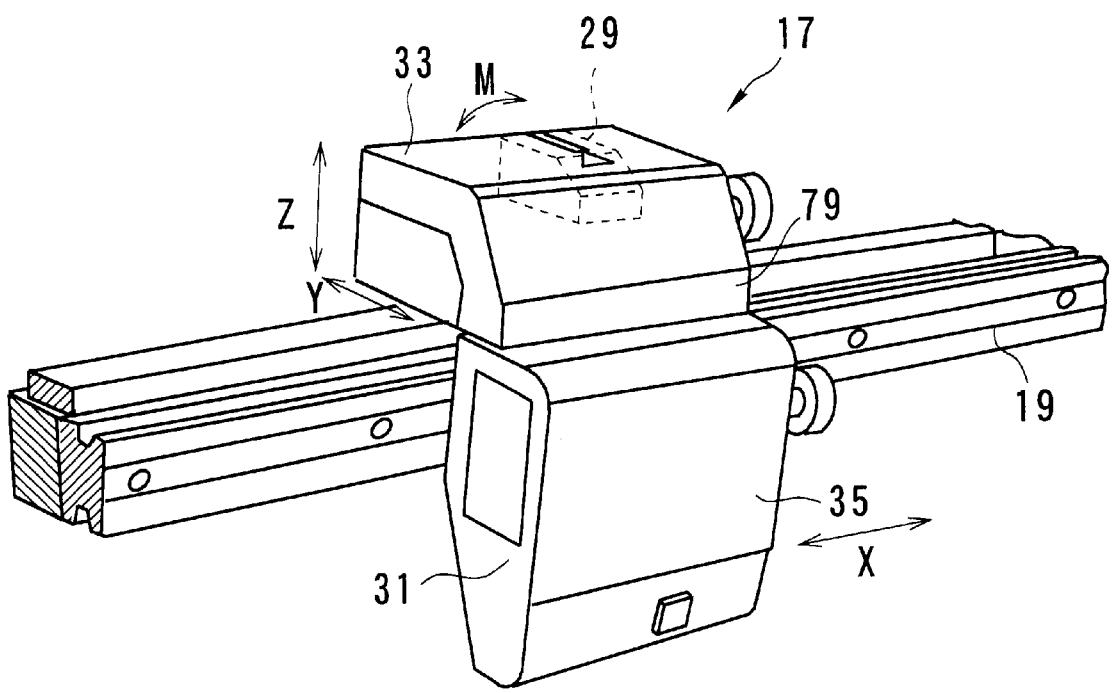
FIG. 6 is a perspective view of the bending angle measurement apparatus.

Next, the bending angle measurement apparatus 17 will be described in more detail. In the bending angle measurement apparatus 17, as shown in FIG. 6, an angle detecting head 29 is rockable with a predetermined rock angle in an M direction which is a rebound direction of a workpiece bent side, movable parallel to the die D in the X direction (i.e., a direction along a workpiece bent line), horizontally movable in a Y direction which is a direction extending close to or apart from the workpiece, and vertically movable in a Z direction in which the die D is raised/lowered (i.e., a direction crossing at right angles to X, Y directions). That is to say, in the present embodiment, the angle detecting head 29 can be moved in three X, Y, Z axial directions, and rockable in the M direction.

As shown in FIGS. 6, 8, 9, 10, the bending angle measurement apparatus 17 is provided with a first slide member 31 for moving the angle detecting head 29 in the X and Z directions, a second slide member 33 for moving the angle detecting head 29 in the Y direction, and a rocking mechanism for rocking the angle detecting head 29 in the M direction.

Figure 11:
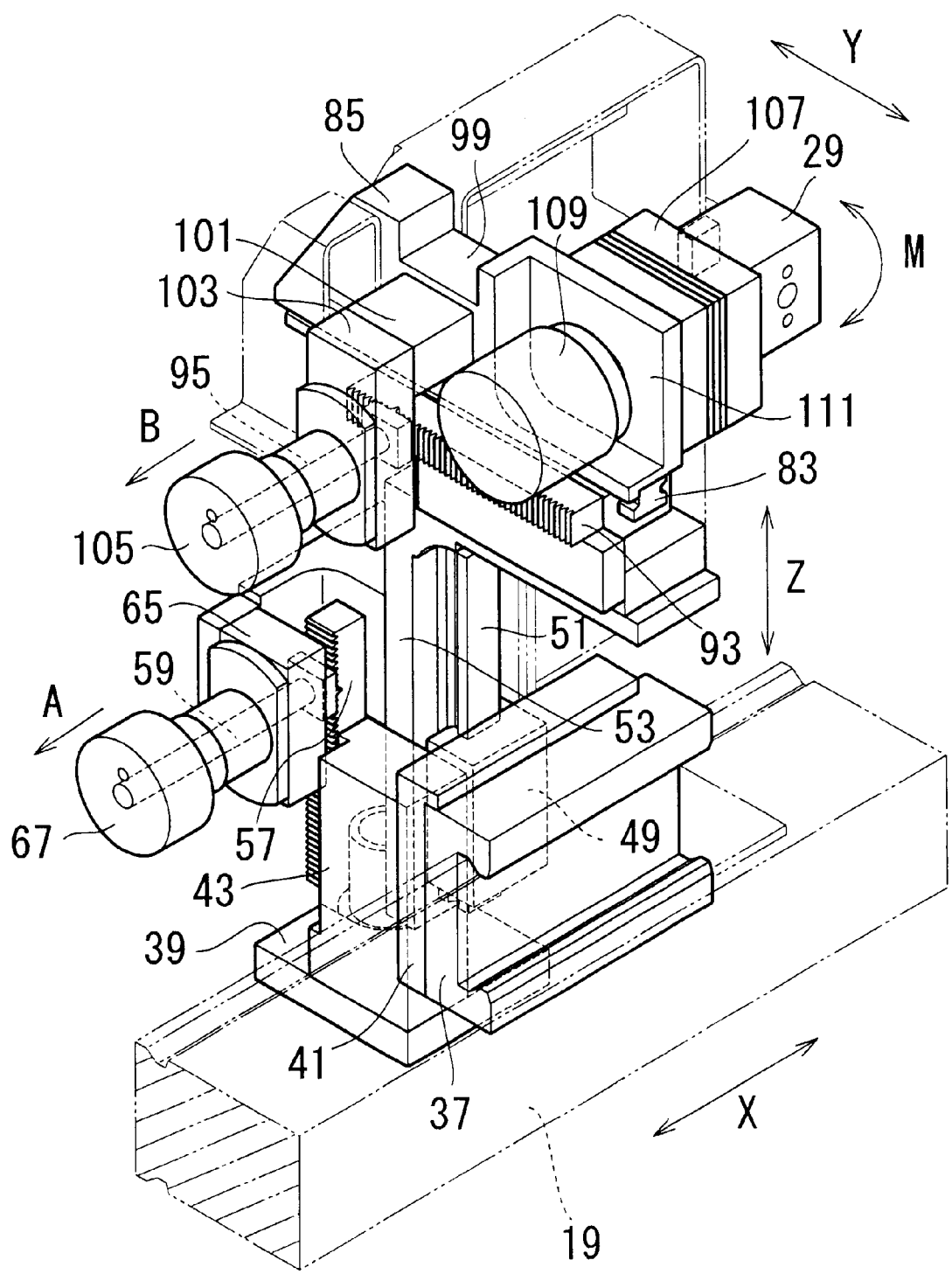
FIG. 11 is a perspective view showing a state of the bending angle measurement apparatus with a cover removed therefrom as seen from the back of the bending machine.
Figure 12:
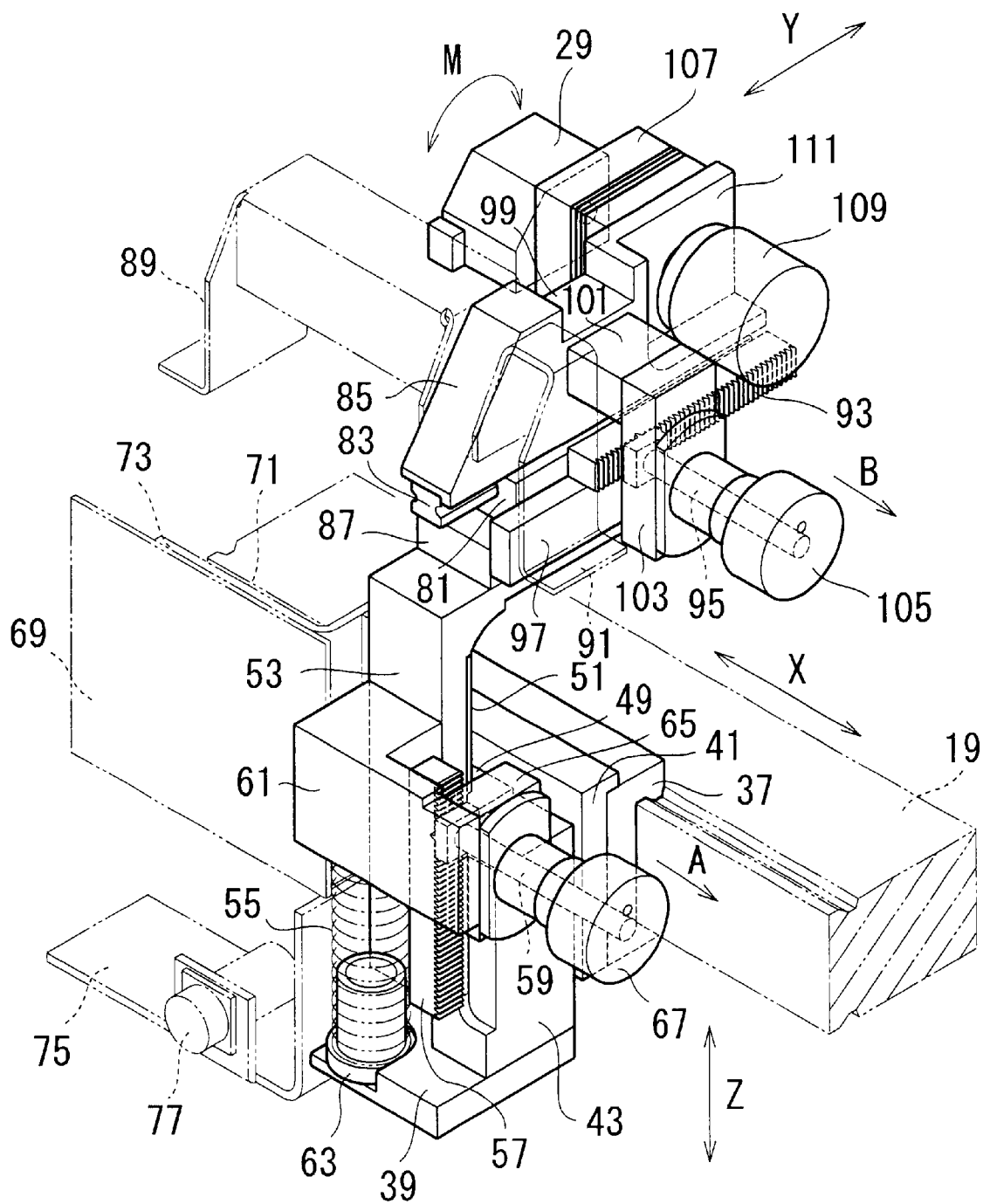
FIG. 12 is a perspective view showing a state of the bending angle measurement apparatus with the cover removed therefrom as seen from the front of the bending machine.

As shown in detailed constitution perspective views of FIGS. 11 and 12 from which a cover 35 is removed, the first slide member 31 is provided with an X slider 37 movable along the guide rail 19 disposed parallel to the die D, and a base block 53 movable in a direction crossing at right angles to the moving direction of the X slider 37. Since the X slider 37 is attached to be slidable along the guide rail 19, the X slider runs parallel to the die D, and can move the angle detecting head 29 in the X direction.

Figure 8:
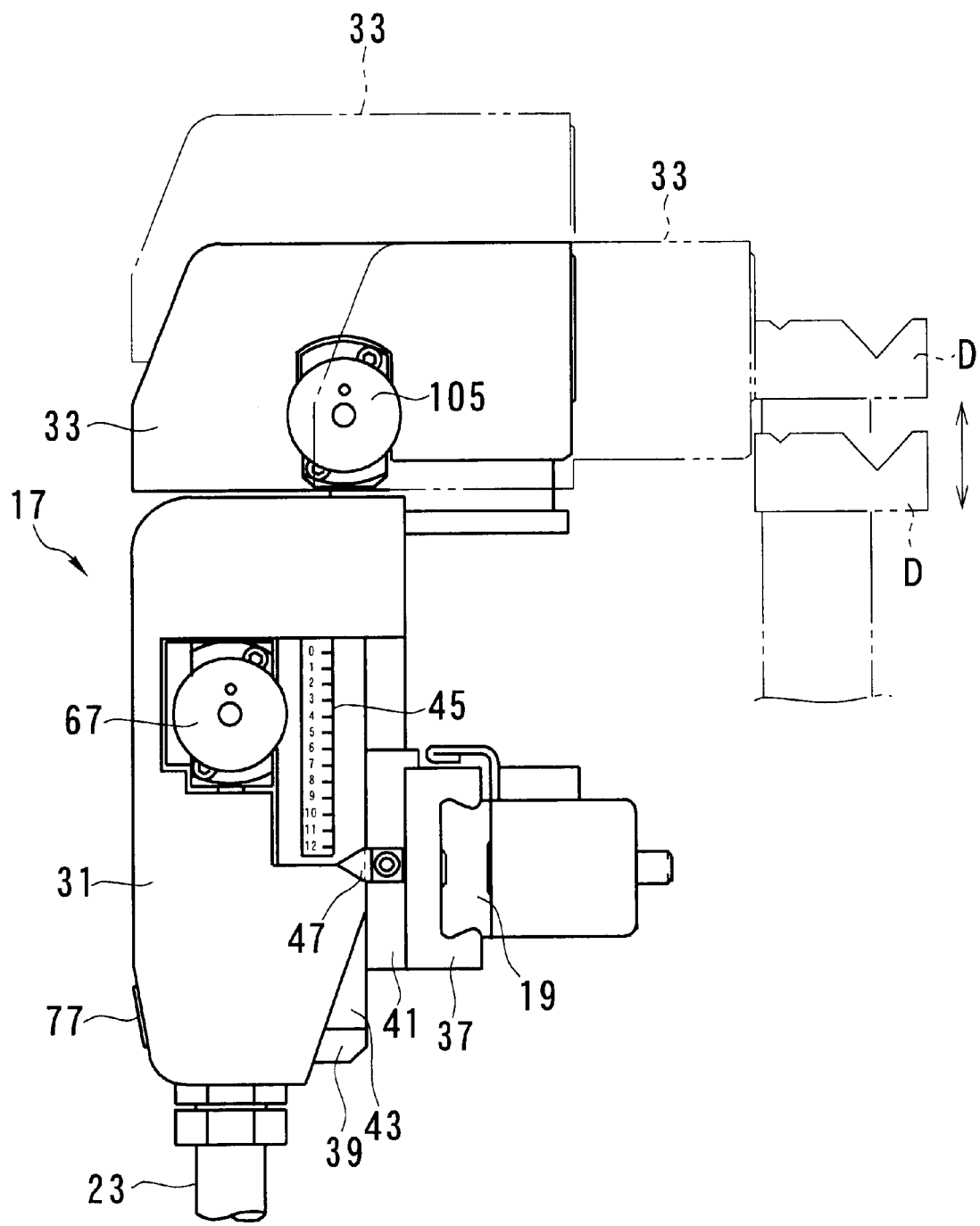
FIG. 8 is a side view of the bending angle measurement apparatus.
Figure 9:
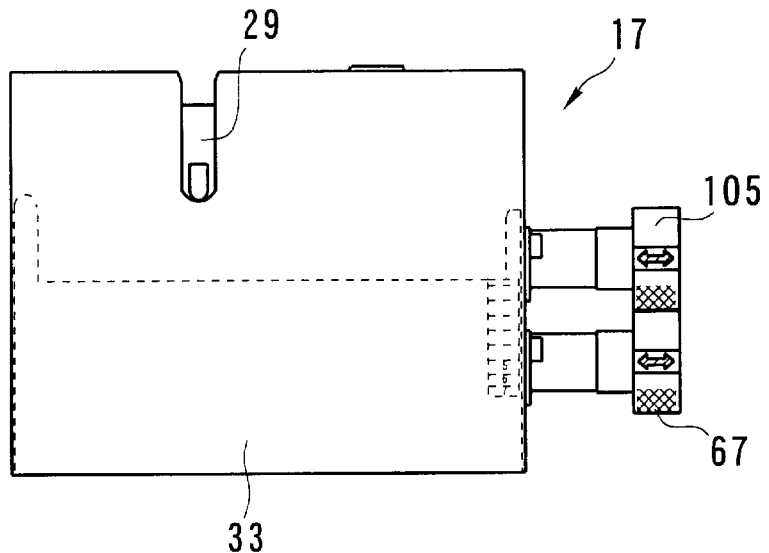
FIG. 9 is a plan view of the bending angle measurement apparatus.
Figure 10:
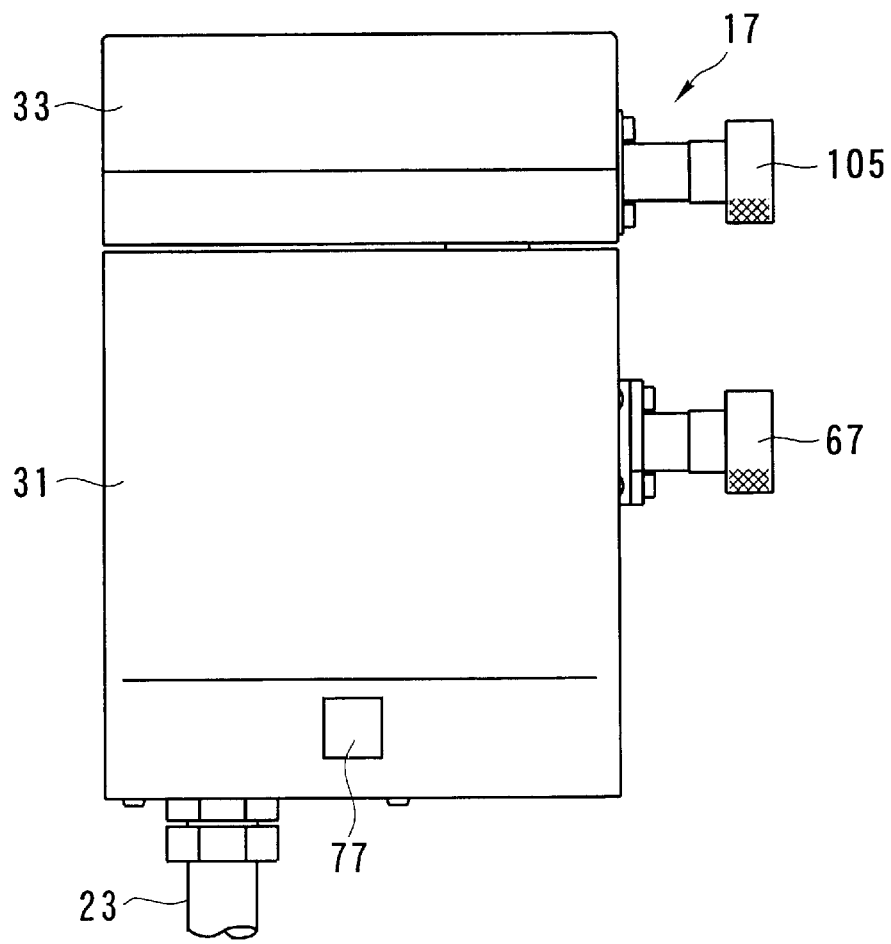
FIG. 10 is a front view of the bending angle measurement apparatus.

The base block 53 is formed as an inverse L-shaped block as shown in FIGS. 11 and 12, and has a spring seat 39 described later on a lower end thereof. Moreover, a support 43 is disposed to stand in a vertical direction on the base block 53, and a scale 45 (see FIG. 8) is attached to the side surface of the support 43 such that a movement amount of the angle detecting head 29 in the Z direction is checked. As shown in FIG. 8, graduation of the scale 45 can be read by a pointer 47 attached to the side surface of a middle plate 41 which is fixed to the X slider 37.

Moreover, the base block 53 is provided with a raising/lowering mechanism for moving the angle detecting head 29 in the Z direction. The raising/lowering mechanism is constituted of the rail guide 49 fixed to the middle plate 41, and a rail 51 joined to and guided by the rail guide 49. The rail guide 49 is disposed on the middle plate 41 by turning the longitudinal direction of the rail guide to a vertical direction. The rail 51 is fixed to one main surface of a vertical section of the base block 53. Therefore, the base block 53 can move along the rail guide 49 in the Z direction.

As shown in FIGS. 11 and 12, the spring seat 39 is provided with a coil spring 55, rack 57 and stopper 59 for raising/lowering the base block 53 in a stepwise manner. The coil spring 55 is disposed between an arm member 61 attached to a back surface of the base block 53, and the spring seat 39, and constantly urges or lifts the base block 53 upward. The coil spring 55 is attached to an outer periphery of a cylindrical spring support member 63 fixed to the spring seat 39 in such a manner that a base end of the coil spring is supported. Additionally, a tip end of the coil spring is inserted into and supported by a circular hole (not shown) formed in a lower end surface of the arm member 61, so that the entire coil spring is supported without falling.

The rack 51 is fixed to the vertical surface of the arm member 61 while the longitudinal direction turns to the Z direction. The stopper 59, joined to the rack 57, for positioning and fixing a height position of the base block 53 is disposed on a stopper attachment block 65 which is fixed to a tip end of the arm member 61. The stopper 59 engages with a saw blade portion of the rack 57, and positions/fixes a rising position of the base block 53 in the stepwise manner.

Moreover, the stopper 59 is urged by a spring (not shown) built in the stopper attachment block 65 to always engage with the rack 57. The stopper 59 is detached from the rack 57 by manually operating a disc-shaped knob 67 movably attached to the stopper attachment block 65 in a direction of an arrow A in FIG. 6.

Furthermore, on the base block 53, as shown in FIG. 12, a substrate attachment stay 73 is fixed with screws, to which a pair of printed wiring boards 69, 71 provided with a control circuit, electronic component, and the like for driving/controlling the angle detecting head 29 as described above are attached. Additionally, as shown in FIG. 12, a cover attachment stay 75 for attaching/supporting the cover 35 is fixed to the base block 53.

Moreover, the cover attachment stay 75 is provided with a switch 77 for switching an automatic detection mode in which the bending angle of a workpiece W is automatically detected by the angle detecting head 29, and a manual detection mode for manually detecting the bending angle.

Since the switch 77 is disposed on the bending angle measurement apparatus 17 itself in this manner, the operator can switch the mode in front of the bending machine 1 without going to the pendant operation box 15, so that operability is enhanced.

As described above, since the first slide member 31 can be moved parallel to the die D in the X direction, the angle detecting head 29 can be moved to a predetermined measurement position to detect the bending angle in the position. Therefore, for example, in the continuous-length workpiece W shown in FIG. 17, the bending angle is not necessarily the same over the entire area of the longitudinal direction of the workpiece. Even in this case, the angle detecting head 29 can be moved to the desired measurement position. Moreover, since there are various bent shapes besides a V shape, the bending angle measurement apparatus 17 can freely be moved to the measurement positions of the workpiece W in accordance with different shapes.

Moreover, the first slide member 31 can be raised/lowered in the Z direction as the vertical direction. Therefore, even when the bending angles of the workpieces W different in the bending angle (the height of the bent side) from each other as shown in FIGS. 18A and 18B are measured, the angle detecting head 29 can be brought close to the bent portions to measure the bending angles.

As shown in the detailed constitution perspective views of FIGS. 11 and 12 from which a cover 79 shown in FIG. 6 is removed, the second slide member 33 is provided with a rail guide 81 disposed in the direction extending close to or apart from the workpiece W (Y direction crossing at right angles to the direction in which the die D is disposed), a rail 83 movable along the rail guide 81, and a Y slider 85 which is a base fixed to the rail 83 and provided with a cutout 99. Since the Y slider 85 is attached to be slidable along the rail guide 81, the Y slider 85 runs at right angles to the die D, and can move the angle detecting head 29 in the Y direction.

As shown in FIG. 12, the rail guide 81 is fixed to an upper end surface of a support base 87 fixed to a top surface portion of the base block 53, and can slidably guide the rail 83. For the Y slider 85 fixed to the rail 83, a pair of cover attachment stays 89, 91 for attaching the cover 79 is attached to both sides opposite to each other of the Y slider 85.

Moreover, as shown in FIGS. 11 and 12, the Y slider 85 is provided with a rack 93 and stopper 95 so that the Y slider 85 can move in the stepwise manner. The rack 93 is fixed onto a rack support member 97 fixed to the side surface of the support base 87, and disposed parallel to the rail guide 81. The stopper 95 engaging with the rack 93 to position/fix the slide position of the Y slider 85 is disposed on a stopper attachment block 103 which is attached to the Y slider 85 via a connection plate 101.

The stopper 95 engages with the saw blade portion of the rack 93, and positions/fixes a slide position of the Y slider 85 in the stepwise manner. Moreover, the stopper 93 is urged by a spring (not shown) incorporated in the stopper attachment block 103 to always engage with the rack 95. The stopper 95 is detached from the rack 93 by manually operating a disc-shaped knob 105 attached to the stopper attachment block 103 in a direction of an arrow B in FIG. 11.

Figure 19:
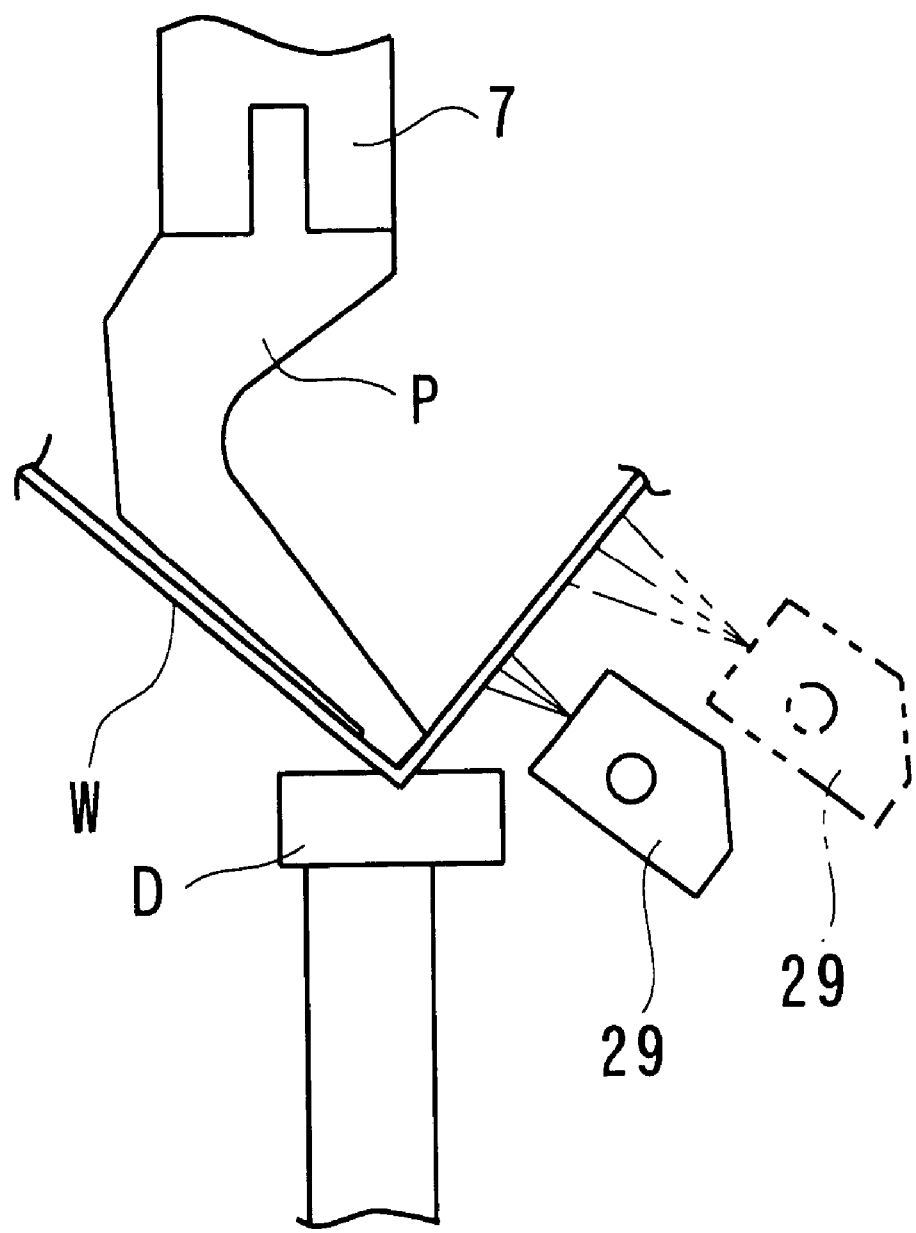
FIG. 19 is a perspective view showing a state in which the angle detecting head is moved in a Y direction.

As described above, since the second slide member 33 is movable in the Y direction, as shown in FIG. 19, the angle detecting head 29 can be brought close to the bent portion of the workpiece W in a position shown by a solid line from a position shown by a dotted line. In the four axial directions, since the angle detecting head is rockable in the M direction and movable in the X, Y and Z directions in this manner, the angle detecting head 29 can be brought close to the bent portion even of the workpiece having any bent shape, and the accurate bending angle of the workpiece can be detected.

As shown in FIGS. 11 and 12, the rocking mechanism for rocking the angle detecting head 29 in the M direction is constituted of a driving motor 107 as a driving section, and an encoder 109. The driving motor 107 comprises, for example, a stepping motor, and is fixed to a head attachment portion 111 on the side of a thinned tip end of the Y slider 85. Moreover, the angle detecting head 29 is attached to a driving shaft of the driving motor 107.

The angle detecting head 29 can be rocked by a desired angle centering on the driving shaft by the driving motor 107. The encoder 109 is a rotary encoder for successively detecting a rotation angle of a point at which the angle detecting head 29 is rocked, and is attached to the head attachment portion 111 on a side opposite to the side on which the driving motor 107 is disposed.

Figure 13:
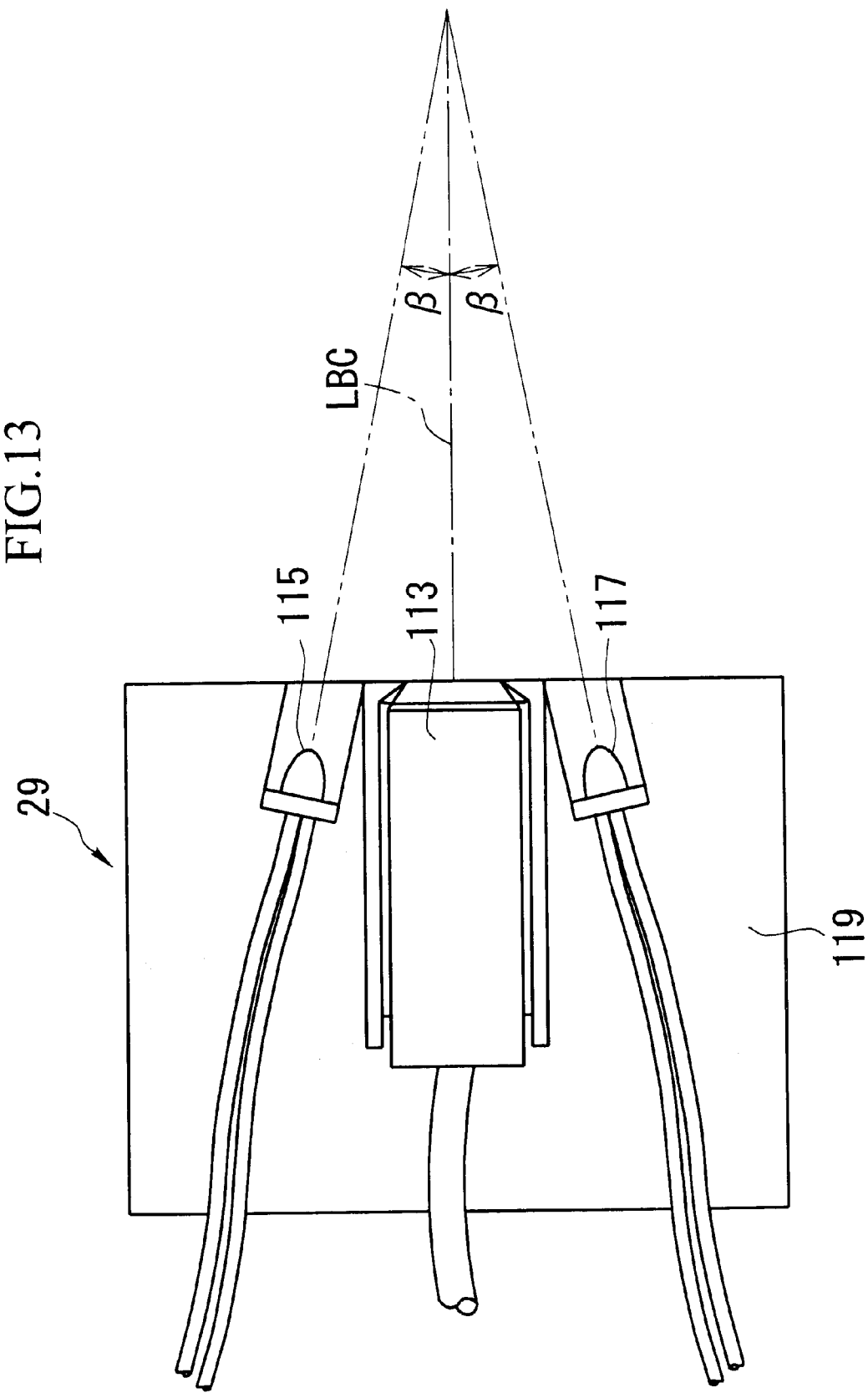
FIG. 13 is an enlarged sectional view of the angle detecting head.

As shown in FIG. 13, the angle detecting head 29 is provided with a laser projector 113 as an emitter, and first and second receivers 115 and 117 as a pair of receivers. The laser projector 113 is formed of a semiconductor laser for irradiating the workpiece W with laser light, and embedded in a substantially middle portion of a rectangular sensor main body 119.

The first and second receivers 115 and 117 are formed, for example, of photodiodes, and lenses are embedded in upper and lower surfaces of the receivers so as to hold the angle detecting head 29 therebetween and not to be exposed to the outside. Moreover, the first and second receivers 115 and 117 are disposed a equal distances from the laser projector 113, so that the respective receivers receive the same amount of reflected light.

Furthermore, the first and second receivers 115 and 117 are tilted in directions which cross an irradiation axis LBC of the laser projector 113, so that the laser light reflected from the surface of the workpiece W is easily received by the front surface of each receiver. A disposing angle β of the first or second receiver 115, 117 to the irradiation axis LBC depends on a distance between the angle detecting head 29 and the workpiece W, but is preferably, for example, ten degrees.

The angle detecting head 29 constituted as described above can detect the bending angle of the workpiece W only when disposed at the predetermined distance from the workpiece W, and cannot measure the bending angle if the distance from the workpiece W is not correct. In the present embodiment, though the preferable distance depends on reflectance of a material of the workpiece W, the head can correctly read the bending angle at the distance between the angle detecting head 29 and the workpiece W disposed opposite to each other in a range of 35 to 75 mm.

A principle by which the angle detecting head 29 constituted as described above detects the bending angle of the workpiece W will be described with reference to FIGS. 14 and 15.

Figure 14:
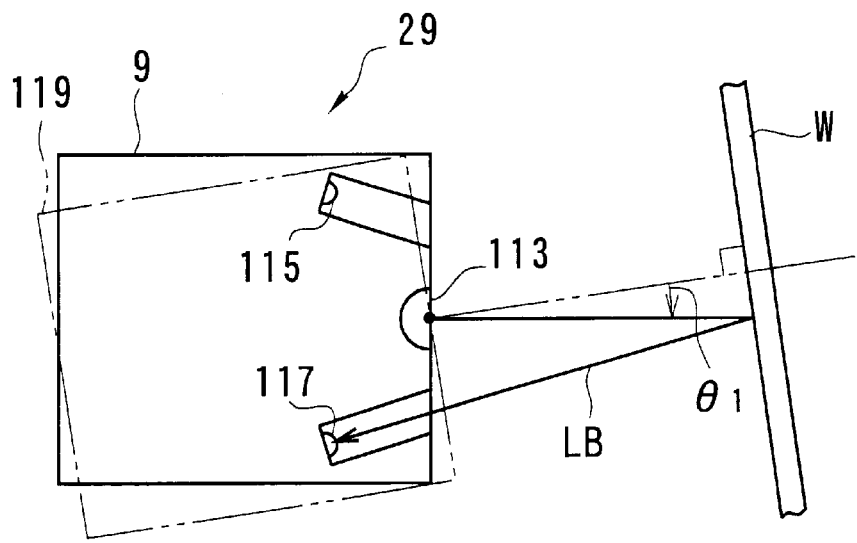
FIG. 14 is an explanatory view showing a principle for measuring the bending angle by the angle detecting head.

As shown in FIG. 14, a laser beam LB emitted from the laser projector 113 of the rocking angle detecting head 29 is reflected by the surface of the workpiece W, and received by the first or second receiver 115 or 117. In this case, the rotation angle of the angle detecting head 29 is detected by the encoder 109.

For example, as shown in FIG. 14, when the angle detecting head 29 is rotated to a position shown by a solid line by an angle θ1 from a position shown by a two-dot chain line, an inclination angle of the second receiver 117 becomes close to an angle of the reflected light from the workpiece W, and the light is received by the second receiver 117. Therefore, the NC controller can clearly recognize a peak of a reflected light amount without being influenced by an irregularly reflected light from the surface of the workpiece W. This can also apply to the first receiver 115.

Figure 15:
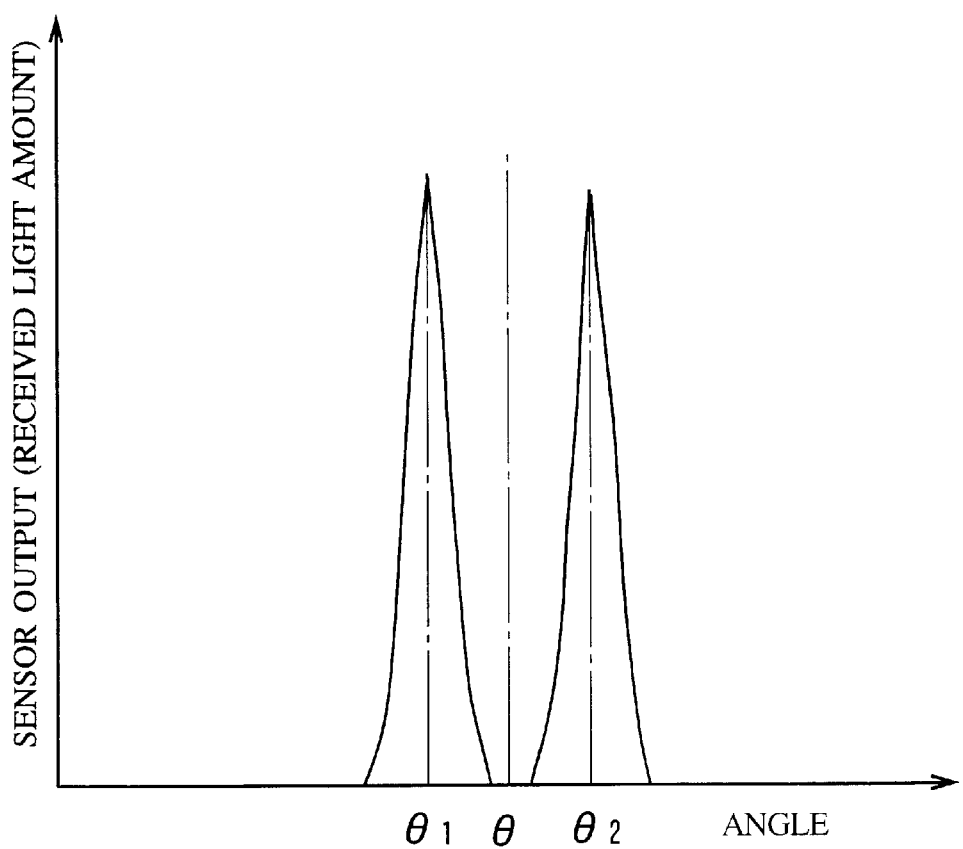
FIG. 15 is a graph showing the principle for measuring the bending angle by the angle detecting head.

FIG. 15 shows a change of the received light amount with respect to the rotation angle of the angle detecting head 29.

In general, when the angle detecting head 29 is rotated by the angle θ1 in a counterclockwise direction with respect to a standard angle θ (θ=zero degree in FIG. 15), the amount of the light received by the first receiver 115 is maximized. Moreover, when the angle detecting head 29 is rotated by an angle θ2 in a clockwise direction with respect to the standard angle θ, the amount of the light received by the second receiver 117 is maximized.

It is seen that since the first and second receivers 115 and 117 are disposed at the equal distances from the laser projector 113, the laser beam LB from the laser projector 113 is vertically projected to the workpiece W in a middle position between the rotation angle θ1 of the angle detecting head 29 of a point at which the received light amount of the first receiver 115 reaches its maximum in FIG. 15, and the rotation angle θ2 of the angle detecting head 29 of a point at which the received light amount of the second receiver 117 reaches its maximum. Therefore, an angle 2θ of the bent workpiece W is obtained from the following equation (1).

$$2\theta = \theta 1 + \theta 2 \quad \text{Equation (1)}$$

A method of using the bending angle measurement apparatus 17 constituted as described above to measure the bending angle of the workpiece W bent by the bending machine 1 will next be described.

First, an original point of the angle detecting head 29 is obtained. That is to say, a magnet seal (not shown) is attached to the side surface of the die on the side opposite to the angle detecting head 29. Moreover, the first slide member 31 is moved in the X and Z directions, the second slide member 33 is moved in the Y direction, and the angle detecting head 29 is moved to the position opposite to the magnet seal. Furthermore, an original point button disposed on the operation panel 21 is pressed to obtain the original point of the angle detecting head 29. In this case, when the laser beam emitted from the laser projector 113 sticks out from the magnet seal, the original point is again obtained after adjusting the height of the angle detecting head 29 and the distance thereof from the die D.

Figure 16:
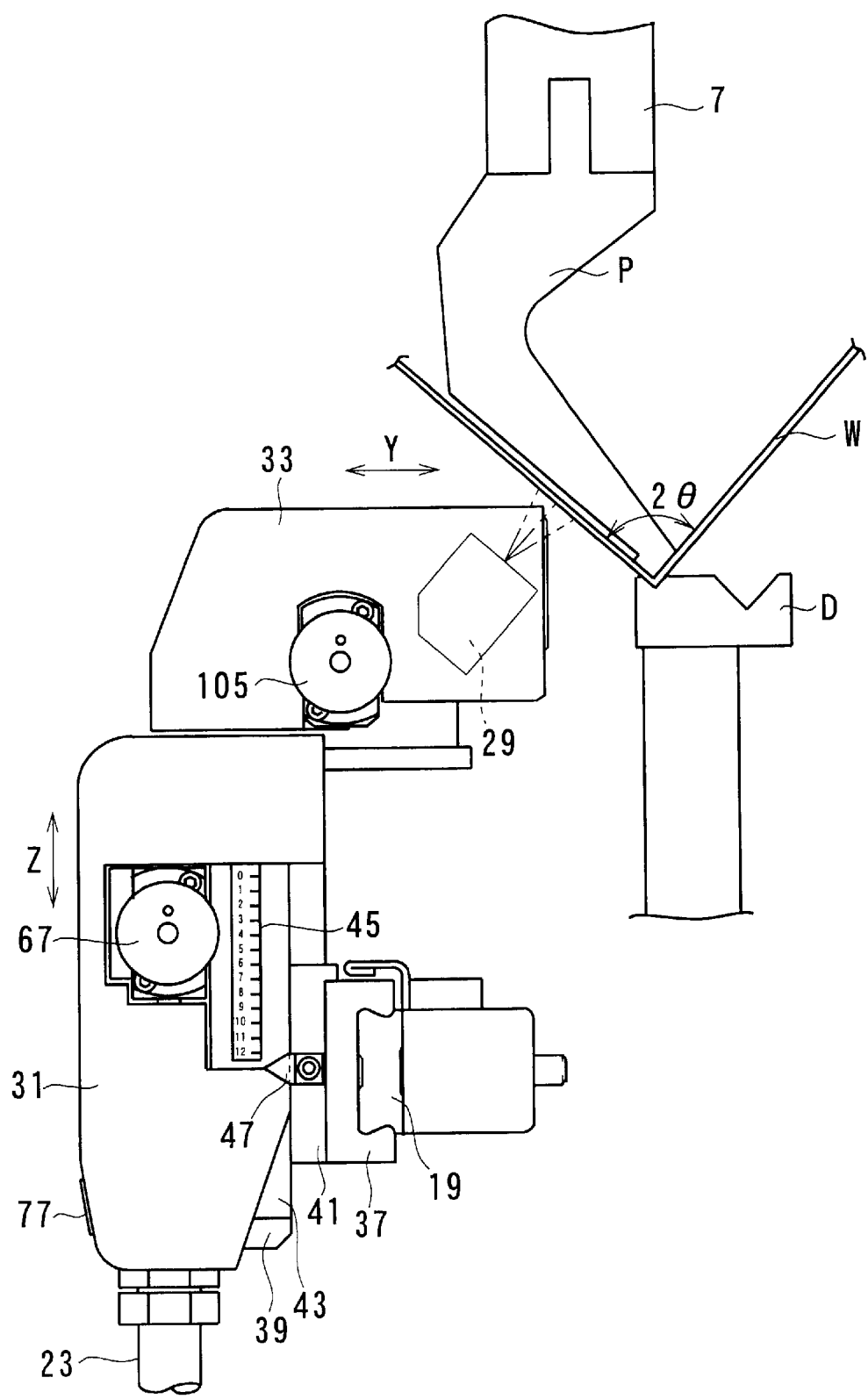
FIG. 16 is a side view showing a state in which the workpiece bending angle is measured by the bending angle measurement apparatus.

Subsequently, various working data such as the plate thickness, bending angle, and the like of the workpiece W are inputted into the NC controller, and the workpiece W is bent by the bending machine 1 until the target bending angle is obtained. Moreover, after the bending process of the workpiece W is finished, the bending angle measurement apparatus 17 retreated from the bending position is moved to the measurement position of the workpiece W along the guide rail 19 disposed parallel to the die D. Subsequently, the respective knobs 67, 105 of the bending angle measurement apparatus 17 are pulled to move and adjust the angle detecting head 29 in the Z and Y directions, and the angle detecting head 29 is brought close to the bent portion (flexed portion) of the workpiece W as shown in FIG. 16. Since the angle detecting head 29 is disposed in the bent portion of the workpiece W in this manner, influence of deflection of the workpiece W is reduced, and more accurate bending angle can be measured.

Subsequently, after the angle detecting head 29 is set in the predetermined measurement position, the angle detecting head 29 is rocked at a desired rock angle by the driving motor 107, and the bent surface of the workpiece W is irradiated with the laser beam by the laser projector 113. Moreover, the amount of the light received by the first and second receivers 115 and 117 is converted to an electric signal, the electric signal is transferred to the NC controller, and a result of detection of the rotation angle of the angle detecting head 29 by the encoder 109 is similarly transferred to the NC controller.

The NC controller obtains the angles θ1 and θ2 from the waveform diagram of the sensor output (received light amount) and rotation angle shown in FIG. 15, and calculates the bending angle of the workpiece W by the above equation (1). The obtained bending angle 2θ is digitally displayed in the display of the operation panel 21 in such a manner that the operator can quickly and visually identify the bending angle. When the bending angle is not the target angle, the workpiece W is bent again by the bending machine 1. When the bending angle is the target angle, the workpiece W is extracted from the die D after retreating the bending angle measurement apparatus 17. Subsequently, the digital protractor 27 is brought in contact with the bent portion of the workpiece W, and an actual bending angle is measured.

As described above, in the constitution in which the angle detecting head 29 can be rocked in the M direction, further moved in the X, Y and Z directions, and are therefore appropriately movable in the four axial directions, the angle detecting head 29 can be moved and positioned into the vicinity of the bent portion of the workpiece W, and the bending angle of the workpiece W can be measured with good precision. Moreover, even with the workpiece W which is bent by an acute angle or in a complicated shape, provided with a hole, a molded material, and the like, or bent in various bent shapes, the angle detecting head 29 can be brought close to the bent portion of the workpiece W, and the bending angle of the workpiece W can be detected with a high precision.

Furthermore, the bending angle measurement apparatus 17 is provided with a mode changeover switch 561 by which an automatic follow-up mode or a manual follow-up mode can be selected, and the mode changeover switch 561 can not only switch both modes but also switch a state to a selecting state of either mode from a non-selecting state in which no mode is selected.

The mode changeover switch 561 is disposed on the bending angle measurement apparatus 17 disposed on the front surface of the bending machine 1. Therefore, if necessary, the operator can switch an automatic/manual operation to select the mode within a bending process operation area and even after starting the operation once. That is to say, even after the operation is started without selecting any mode, the automatic follow-up mode or the manual follow-up mode can be selected midway in the operation. Alternatively, even when the automatic follow-up mode is selected before starting the operation, the mode can be switched and the manual follow-up mode can be selected even midway in the operation. Furthermore, even when the manual follow-up mode is selected before starting the operation, the mode can be switched and the automatic follow-up mode can be selected even midway in the operation.

On the other hand, the digital protractor 771 is provided with a reference surface 773 for measuring the angle, and a measurement surface 775 whose angle formed with the reference surface 773 can freely be changed. The reference surface 773 is allowed to abut closely on one side of the portion of the workpiece which is detached from the bending machine main body and whose angle is to be measured. Moreover, the measurement surface 775 is allowed to abut closely on and trace the other side of the portion, and the angle formed between the reference surface 773 and the measurement surface 775, which agrees with the bending angle of the workpiece, is measured. Furthermore, the angle formed by the measurement surface 775 to the reference surface 773 is measured by an angle movement amount from the original point by a magnetic instrument called Magnescale, and the measured value is indicated in the angle on a display 777.

The operation unit 21 is provided with a keyboard 223 and a display 225. The keyboard 223 is provided with the original point key for use in setting the original points of the bending angle measurement apparatus 17 and digital protractor 771, further ten keys and setting keys for inputting the target angle, spring-back, and the like into the bending angle measurement apparatus 17, automatic key for selecting the automatic follow-up mode of the bending angle measurement apparatus 17, manual key for selecting the manual follow-up mode, and other necessary various keys. Moreover, the display 225 is provided with a step display 227 for displaying a step number or a mode type, and a data display 229 for displaying values inputted/set by the operator, such as the target angle and spring-back.

Furthermore, for the angle measured value of the bending angle measurement apparatus 17, the step display 227 indicates that the angle measured value is displayed, and the angle measured value is displayed in the data display 229. Additionally, for the angle measured value of the digital protractor 771, the step display 227 indicates that the angle measured value is displayed, and the angle measured value is displayed in the data display 229.

The BI control unit 991 is provided with a controller 993 having a function of an arithmetic processor to calculate the bending angle of the workpiece being pressed by the bending angle measurement apparatus 17, and an input/output section 995. The controller 993 also has a function of another arithmetic processor to calculate an angle error between the bending angle measured by the bending angle measurement apparatus 17 and the target angle, and convert the angle error to the corresponding depth vale (D value). The BI control unit 991 is also provided with a pulse generator 996 for use in the automatic follow-up mode, and a switch 997 for using the pulse generator 996 instead of the hand pulser 25 of the NC console 15 in the automatic follow-up mode. Since the BI control unit 991 is connected to the NC control 15 via the switch 997, the bending indicator 331 is connected to the NC device.

That is to say, to connect the BI control unit 991 to the NC console 15, the hand pulser 25 is disconnected from the input/output section 133 of the NC console 15, and connected to a terminal of the switch 997 on the side opposite to the pulser generator 996, and a common terminal of the switch 997 is connected to a connector of the input/output section 133 from the hand pulser 25 has been disconnected. Moreover, a connection for transmitting a BI start signal to the BI control unit 991 from the NC console 15, and a connection for transmitting a stop signal to the NC console 15 from the BI control unit 991 may only be disposed.

An operation for connecting the BI control unit 991 to the NC console 15 is remarkably simple in this manner, further it is substantially unnecessary to adjust the NC console 15, and therefore the BI control unit can easily be attached later to the existing NC console 15. As a result, the bending indicator 331 can easily be attached later to the bending machine provided with the existing NC device, and used.

Moreover, in the bending indicator 331, especially the bending angle measurement apparatus 17, operation unit 21 and BI control unit 991 serve as a follow-up control system in the automatic follow-up mode, or a follow-up measurement system in the manual follow-up mode.

Furthermore, the BI control unit 991 is provided with a buzzer 999 for informing an operator of a situation of the bending angle of the workpiece in the follow-up operation by sound. At the end of the bending process by the NC device, when the bending angle measured value of the workpiece reaches the target angle, the buzzer 999 generates a bending end sound to inform the operator that the value reaches the target angle. When the bending angle measured value of the workpiece exceeds the target angle, the buzzer generates a warning sound to warn the operator that the value exceeds the target angle. Moreover, when the bending angle measured value of the workpiece does not reach the target angle and there is an angle error, during the follow-up operation executed for a follow-up stroke amount corresponding to the angle error, the buzzer generates a follow-up operation sound to inform the operator that the follow-up operation is being executed. When the follow-up operation reaches a stroke terminal end thereof, the buzzer generates a follow-up end sound to inform the operator that the stroke terminal end is reached.

An operation of the aforementioned embodiment will next be described with reference to flowcharts of FIGS. 20 to 24.

First, a test piece formed of a material and plate thickness similar to those of the workpiece as a bending process object is prepared. A size of the test piece does not need to be similar to that of the workpiece as far as the material and plate thickness are similar to those of the workpiece, and an appropriate size easy to handle can be selected. This test piece is not a workpiece, but functions similarly as the workpiece only for a purpose of measuring the spring-back, and therefore will hereinafter be referred to as the workpiece.

Moreover, the punch provided with the predetermined tip end R is attached to the punch holder of the bending machine 1, while the die D with the predetermined die width is attached to the die holder. Furthermore, the required bending angle is inputted into the NC console 15 and operation unit 21.

Figure 20:
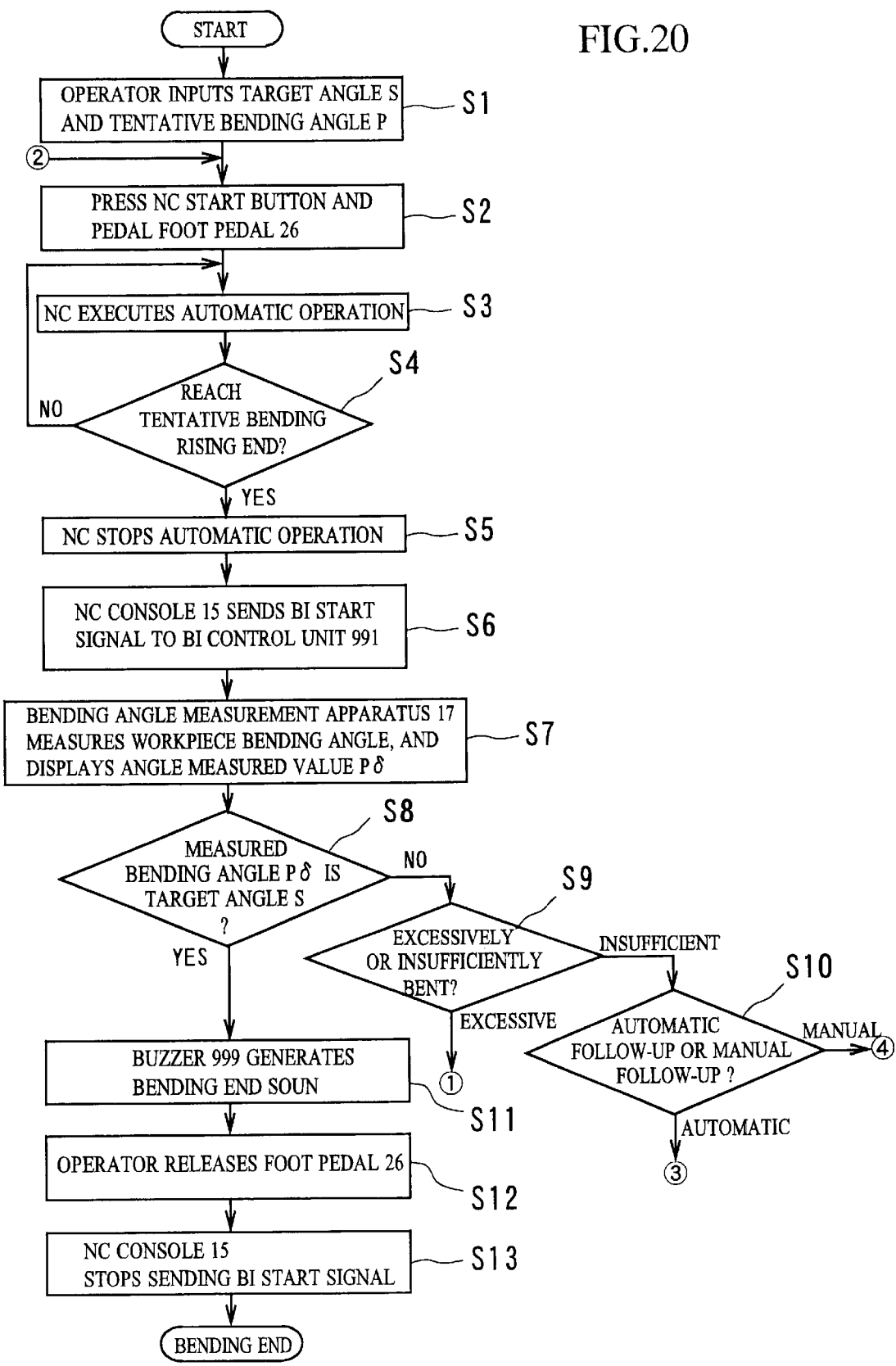
FIG. 20 is a flowchart showing an operation of the bending angle measurement apparatus.

That is to say, when a target angle S is, for example, 90°, as shown in FIG. 20, first, the operator uses the keys to input the target angle S (S=90°) into the operation unit 21, and also uses the keys to input a tentative bending angle P (P=92°) slightly (2 to 3°) larger than the target angle S into the NC console 15 (step S1). On receiving the angle, the controller 135 of the NC console 15 converts the tentative bending angle P to the corresponding D value.

Subsequently, the operator presses an NC start button of the NC console 15, sets the workpiece in the predetermined position of the bending machine main body, and pedals the foot pedal 26 (step S2).

When the NC start button is pressed, the NC is set in an automatic operation mode, and the NC starts automatic operation to execute the bending process in accordance with programmed steps (step S3).

When the lower table 9 rises and reaches a rising end for tentative bending (step S4), the NC automatically stops the operation (step S5).

In this case, the workpiece bending angle is in a range of an arbitrary error (e.g., ±2°) from the set tentative bending angle P (P=92°). Moreover, when the NC only automatically stops, the NC is still set in the automatic operation mode, and in an interlocked state in which the D value cannot be corrected.

When the NC stops the operation, the NC console 15 sends a BI start signal to the BI control unit 991 (step S6). On receiving this signal, the bending indicator 331 is turned on.

Subsequently, the bending angle measurement apparatus 17 first measures the workpiece bending angle, and displays an angle measured value Pδ (the vicinity of the tentative bending angle P including the error) in the display 225 of the operation unit 21 via the BI control unit 991 (step S7).

Here, it is determined whether or not the measured bending angle Pδ corresponds to (agrees with or is in an allowable range of) the target angle S (step S8). When the measured bending angle does not correspond to the target angle S, it is determined whether the workpiece is excessively or insufficiently bent (step S9). When the workpiece is insufficiently bent, it is determined whether the automatic follow-up mode or the manual follow-up mode is set (step S10).

When the measured bending angle Pδ corresponds to the target angle S (Pδ=S), the buzzer 999 of the BI control unit 991 generates an appropriate bending end sound to inform the operator of the correspondence (step S11). Thereby, the operator can securely hear and know that the workpiece bending angle corresponds to the target angle S.

In this case, the operator releases the foot pedal 26 (step S12).

Then, the NC console 15 stops sending the BI start signal to the BI control unit 991 (step S13). On receiving this signal, the bending indicator 331 is turned off. Thereby, the bending ends.

The bending angle of the workpiece in a final pressing state at the end of the bending is an angle S* (S*=90°) corresponding to (agreeing with or in an allowable range of) the target angle S, and the angle value S* (S*=90°) is stored in the controller 993 of the BI control unit 991.

Figure 21:
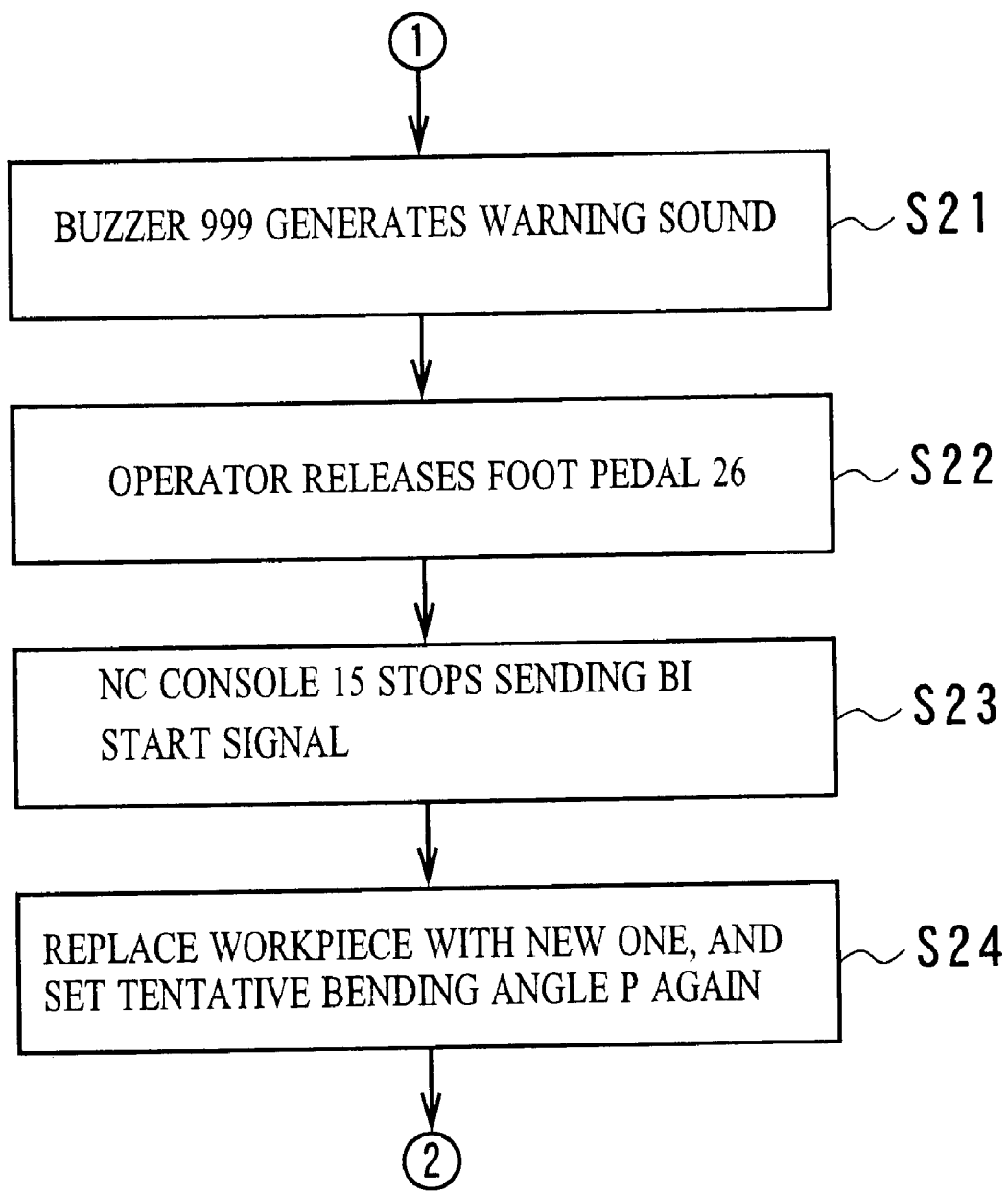
FIG. 21 is a flowchart for a case in which the workpiece is excessively bent.

Moreover, when the measured bending angle Pδ indicates that the workpiece is excessively bent (Pδ<S), as shown in FIG. 21, the buzzer 999 of the BI control unit 991 generates an appropriate warning sound to warn the operator that the workpiece is excessively bent (step S21). Thereby, the operator can securely hear and know that the workpiece bending angle exceeds the target angle S and the workpiece is excessively bent.

On hearing the warning sound, the operator releases the foot pedal 26 (step S22).

Then, the NC console 15 stops sending the BI start signal to the BI control unit 991 (step S23). On receiving this signal, the bending indicator 331 is turned off.

In this case, the workpiece is replaced with a new one, and the tentative bending angle P is set again (step S24). That is to say, for example, a new tentative bending angle is set to Q (Q=93 to 94°). Thereafter, the process returns to ② of FIG. 20, and the operation of and after the step S2 is performed.

Figure 22:
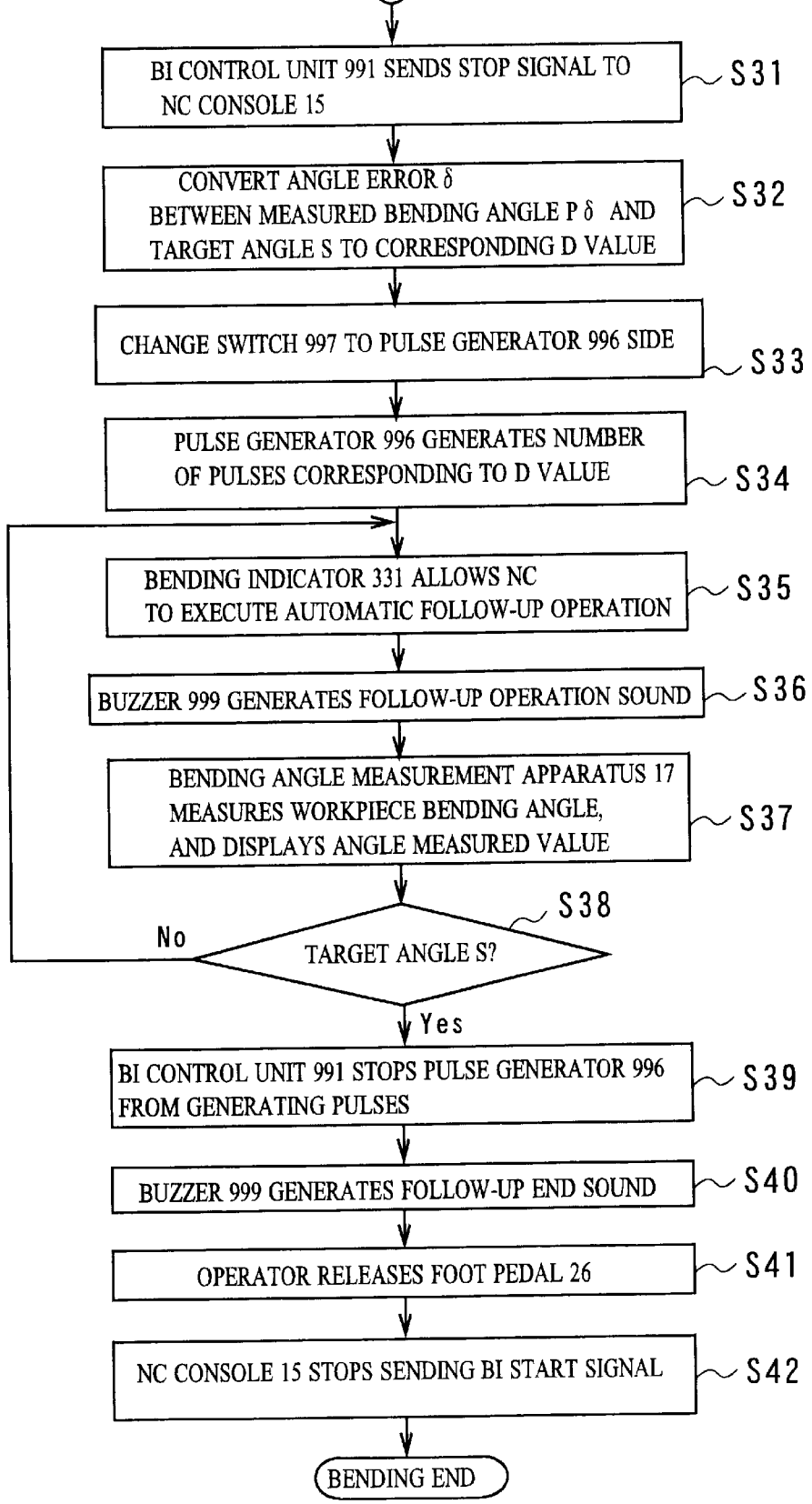
FIG. 22 is a flowchart for a case in which the workpiece is insufficiently bent.

Moreover, when the measured bending angle Pδ indicates that the workpiece is insufficiently bent (Pδ>S), and the automatic follow-up mode is set, as shown in FIG. 22, first the BI control unit 991 sends a stop signal to the NC console 15 (step S31). On receiving this signal, NC cancels the set automatic operation mode, the interlocked state of D value correction is canceled, and there can be obtained a state in which the D value can be corrected.

Subsequently, the BI control unit 991 calculates an angle error Pδ between the measured bending angle Pδ and the target angle S (δ=Pδ−S), and converts the angle error δ to the corresponding D value (step S32).

Moreover, the BI control unit 991 switches the switch 997 to the side of the pulse generator 996 (step S33), and allows the pulse generator 996 to generate a number of pulses corresponding to the D value (step S34).

Thereby, the bending indicator 331 allows the NC to execute the automatic follow-up operation (step S35), while the buzzer 999 of the BI control unit 991 generates an appropriate follow-up operation sound to inform the operator that the automatic follow-up operation is performed (step S36). Thereby, the operator can securely hear and know that the automatic follow-up operation is being executed.

During the automatic follow-up operation, the bending angle measurement apparatus 17 measures the workpiece bending angle at an appropriate interval, and the angle measured value is displayed in the display 225 of the operation unit 21 via the BI control unit 991 (step S37).

When the measured bending angle reaches (agrees with or falls in an allowable range of) the target angle S (step S38), based on the angle measured value transmitted from the bending angle measurement apparatus 17, BI control unit 991 allows the pulse generator 996 to stop generating the pulse (step S39). Additionally, the buzzer 999 generates an appropriate follow-up end sound to inform the operator that the measured bending angle reaches the target angle S (step S40). Thereby, the operator can securely hear and know that the workpiece bending angle reaches the target angle S.

Subsequently, the operator releases the foot pedal 26 (step S41).

Then, the NC console 15 stops sending the BI start signal to the BI control unit 991 (step S42). On receiving this signal, the bending indicator 331 is turned off. Thereby, the bending ends.

The bending angle of the workpiece in the final pressing state at the end of the bending is an angle S* (S*=90°) corresponding to (agreeing with or in an allowable range of) the target angle S, and the angle value S* (S*=90°) is stored in the controller 993 of the BI control unit 991.

Figure 23:
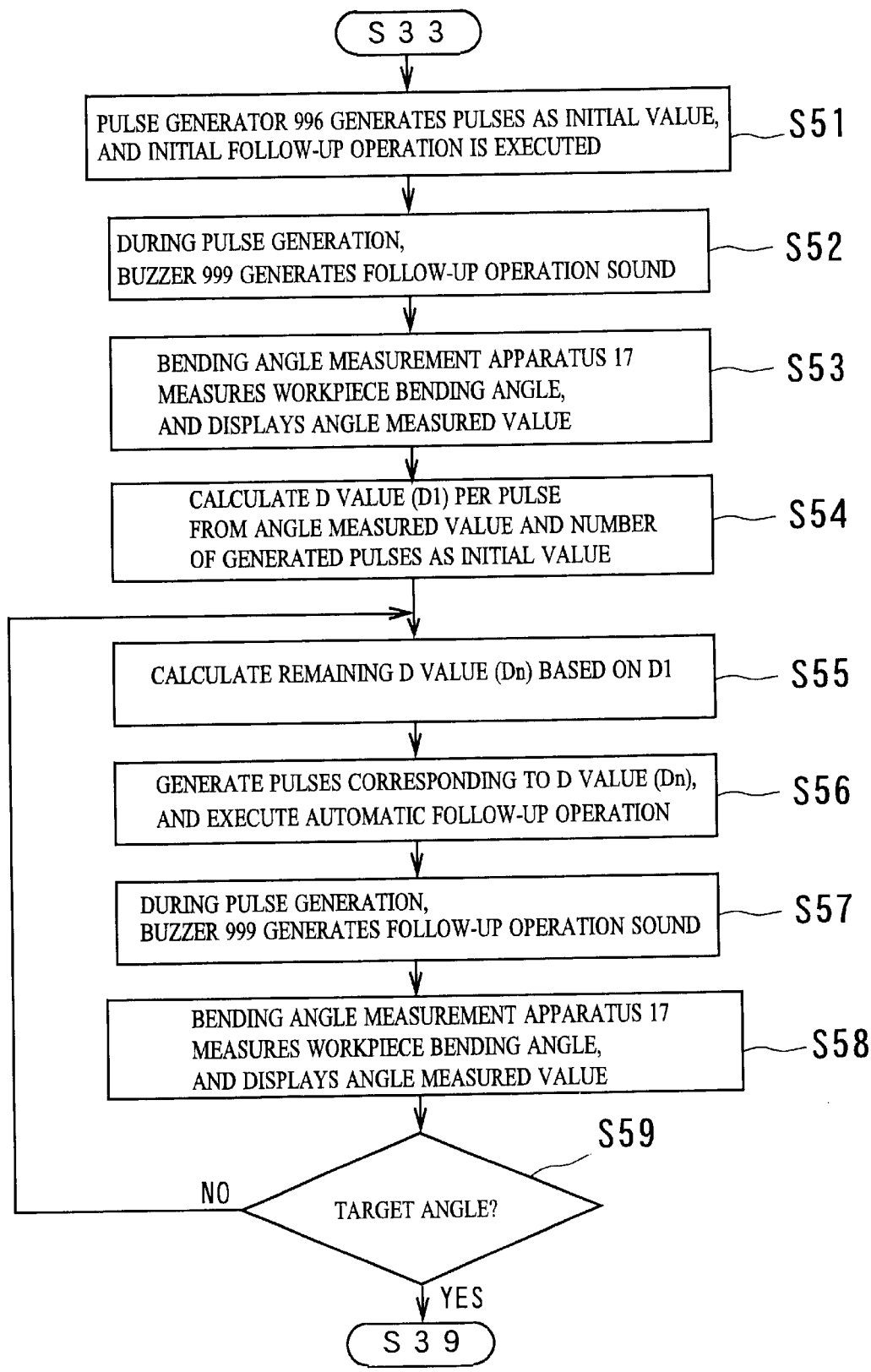
FIG. 23 is a flowchart showing a part of FIG. 22.

FIG. 23 shows the aforementioned steps S34 to S38 in more detail. That is to say, the BI control unit 991 allows the pulse generator 996 to generate the predetermined number of pulses (e.g., 10 pulses) as an initial value, and thereby the bending indicator 331 allows the NC to execute an initial follow-up operation (step S51).

During the initial pulse generation, the buzzer 999 of the BI control unit 991 generates an appropriate follow-up operation sound to inform the operator that the follow-up operation is performed (step S52). Thereby, the operator can securely hear and know that the follow-up operation is being performed.

After the generation of the initial pulses, the bending angle measurement apparatus 17 measures the workpiece bending angle, and displays the angle 15 measured value in the display 225 of the operation unit 21 via the BI control unit 991 (step S53). The BI control unit 991 calculates the D value (D1) per pulse from the angle measured value and the number of initial pulses (i.e., ten pulses) (step S54).

Subsequently, the BI control unit 991 calculates a remaining D value (Dn) based on the obtained D value (D1) per pulse (step S55).

Moreover, the BI control unit 991 allows the pulse generator 996 to generate the number of pulses (n pulses) corresponding to the D value (Dn), and thereby the bending indicator 331 allows the NC to execute the automatic follow-up operation (step S56).

During the generation of the n pulses, the buzzer 999 of the BI control unit 991 generates the appropriate follow-up operation sound to inform the operator that the follow-up operation is performed (step S57). Thereby, the operator can securely hear and know that the follow-up operation is being performed.

After the generation of the n pulses, the bending angle measurement apparatus 17 measures the workpiece bending angle, and displays the angle measured value in the display 225 of the operation unit 21 via the BI control unit 991 (step S58). The BI control unit 991 determines whether or not the angle measured value reaches the target angle S (step S59). When the value does not reach the target angle S, the process returns again to the step S55 of calculating the remaining D value (Dn).

That is to say, when a series of operations for the calculation of the remaining D value (Dn), execution of the automatic follow-up operation based on the D value (Dn), generation of the sound under the follow-up operation, and measurement and display of the workpiece bending angle are repeated several times, the target angle S can accurately be obtained.

Figure 24:
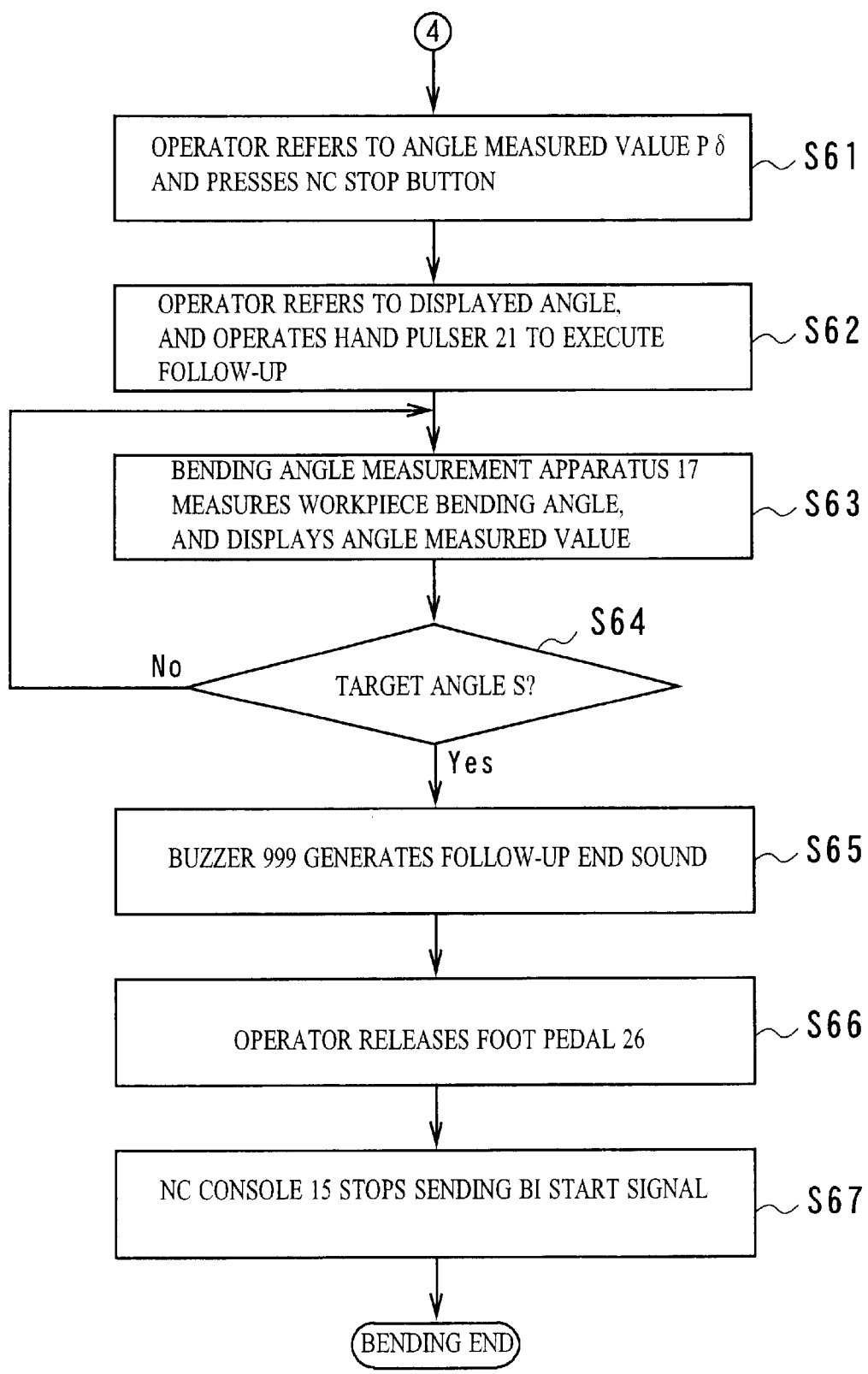
FIG. 24 is a flowchart for a manual follow-up mode.

On the other hand, when the measured bending angle Pδ indicates that the workpiece is insufficiently bent (Pδ>S), and the manual follow-up mode is set, as shown in FIG. 24, the operator sees the angle measured value Pδ displayed in the display 85 of the operation unit 81, confirms that the follow-up is necessary, and presses the NC stop button (step S61). When the NC stop button is pressed, the NC cancels the set automatic operation mode, the interlocked state of the D value correction is released, and the state in which the D value can be corrected is obtained.

Subsequently, referring to the displayed angle, the operator operates the hand pulse 25, and manually performs the follow-up operation (step S62).

During the manual follow-up operation, the bending angle measurement apparatus 17 measures the workpiece bending angle, and the angle measured value is displayed in the display 225 of the operation unit 21 via the BI control unit 991 (step S63).

When the measured bending angle reaches (agrees with or falls in an allowable range of) the target angle S (step S64), the buzzer 999 of the BI control unit 991 generates the appropriate follow-up end sound to inform the operator that the measured bending angle reaches the target angle (step S65). Thereby, the operator can securely hear and know that the workpiece bending angle reaches the target angle S.

Subsequently, the operator releases the foot pedal 26 (step S66).

Then, the NC console 15 stops sending the BI start signal to the BI control unit 991 (step S67). On receiving this signal, the bending indicator 331 is turned off. Thereby, the bending ends.

The bending angle of the workpiece in the final pressing state at the end of the bending is the angle S* (S*=90°) corresponding to (agreeing with or in an allowable range of) the target angle S, and the angle value S* (S*=90°) is stored in the controller 993 of the BI control unit 991.

Figure 25:
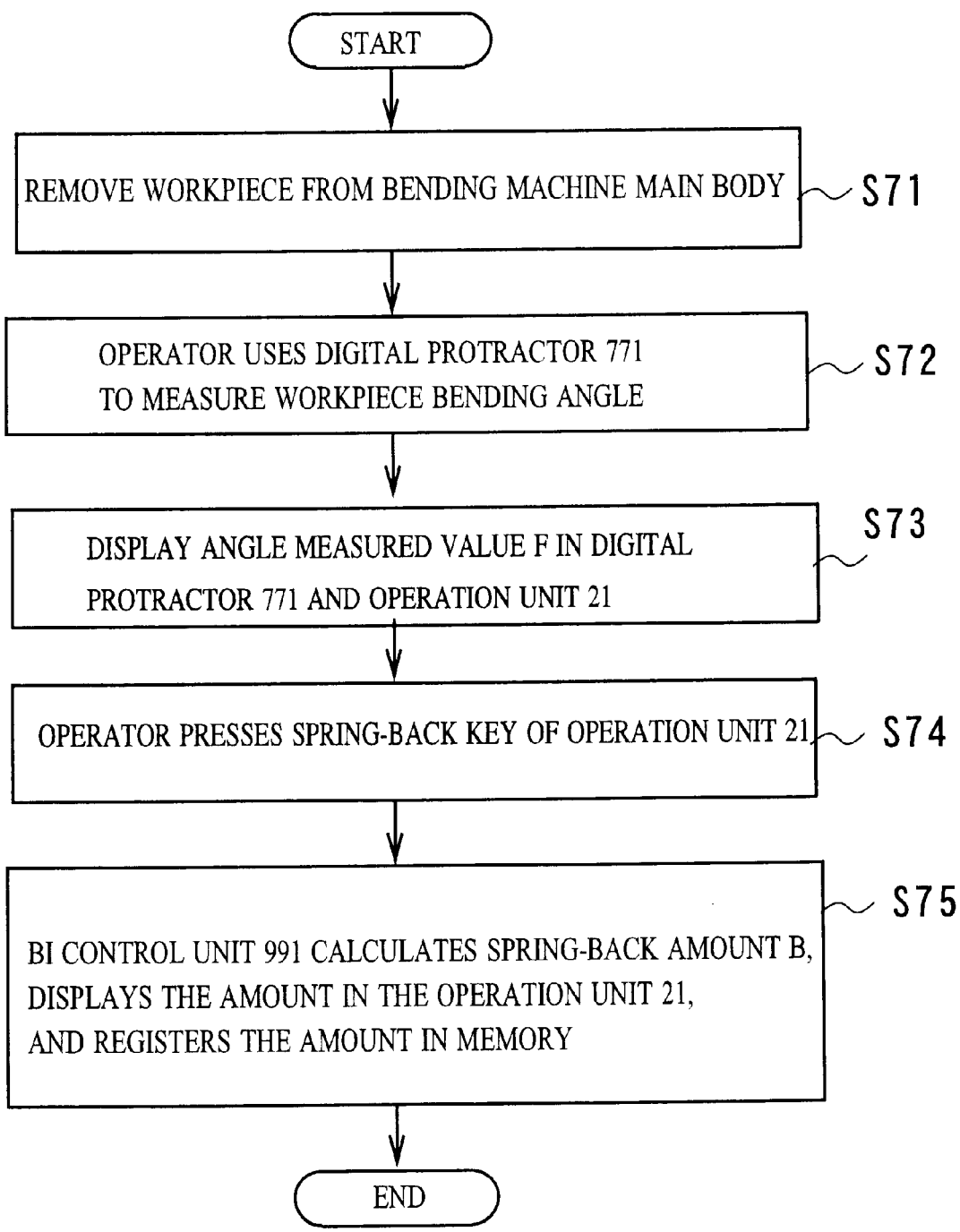
FIG. 25 is a flowchart for obtaining a spring-back amount.

When the necessary bending process ends in this manner, as shown in FIG. 25, the workpiece is removed from the bent machine main body (step S71). Then, the workpiece is detached from the punch P and die D, and brought completely to an unloaded state, and the bending angle is slightly enlarged by spring-back. That is to say, an angle F (e.g., F=91°20') is spread by the spring-back from the angle S* (S*=90°) of a point at which the bending ends.

Subsequently, the operator uses the digital protractor 771 to measure the workpiece bending angle (step S72).

Then, the angle measured value F (F=91°20') is displayed in the display 777 of the digital protractor 771, and also displayed in the display 225 of the operation unit 21 (step S73). That is to say, the operation unit 221 displays that the digital protractor is being used in the step display 227 of the display 225, and displays the angle measured value F (F=91°20') in the data display 229. Referring to the display, the operator can know that the bending angle of the workpiece spread by the spring-back is F (F=91°20').

Subsequently, the operator presses a spring-back key of the operation unit 21 (step S74).

Then, the controller 993 of the BI control unit 991 calculates a spring-back amount B (B=1°20') from the bending angle S* (S*=90°) in the final pressing state and the bending angle F (F=91°20') in the unloaded state, displays the amount in the data display 229 of the operation unit 21, and stores/registers the amount in a memory of the controller 993 (step S75). Referring to this display, the operator can accurately know the spring-back amount B (B=1°20') without calculating the amount.

Moreover, when an actual workpiece is used to perform the bending process, the spring-back amount B (B=1°20') is incorporated in the target angle S (S=90°), a target pressing angle A (A=88°40') is determined, and the target pressing angle A (A=88°40') is key-inputted into the operation unit 21. On the other hand, the tentative bending angle P (P=92°) slightly (by 2 to 3°) wider than the target angle S is key-inputted into the NC console 13, and the operation may be performed similarly as described above.

Additionally, since the controller 993 of the BI control unit 991 executes the operation for incorporating the spring-back amount B (B=1°20') into the target angle S (S=90°) to determine the target pressing angle A (A=88°40'), the operator may only key-input the target angle S (S=90°) and spring-back amount B (B=1°20'). Based on both inputs, the controller 993 of the BI control unit 991 automatically calculates and obtains the target pressing angle A (A=88°40')

As described above, when the bending angle measurement apparatus is used, simultaneously with the end of the measurement of the spring-back, the data can be stored in the BI control unit 991. Therefore, the apparatus is suitable when the once sampled spring-back is repeatedly utilized in machining the workpiece on the same conditions.

Moreover, even not immediately before the machining, or even when the total number of workpieces requiring the machining are not prepared, only with the test piece or a sample workpiece, it is possible to measure the spring-back and register the data into the BI control unit 991 in advance. Therefore, the operation for measuring/registering the spring-back can be executed in intervals between machining times, and an operation schedule can be provided with a degree of freedom.

Additionally, in the aforementioned embodiment, the sensor head 29 is constituted of the projector 113 using one laser diode, and optical sensors 115, 117 using two phototransistors, the sensor head 29 is scanned in the predetermined angle range, an intensity of the laser beam reflected by the workpiece is measured by the optical sensor, an elevation angle of the scanning sensor head 29 is detected, and the workpiece bending angle is calculated based on the elevation angle of a point at which the intensity indicates its peak. However, this constitution is not limited. For example, besides an appropriate non-contact type bending angle measurement apparatus, a contact type bending angle measurement apparatus can also be used. Moreover, in the aforementioned embodiment, the laser beam is used as the measurement light, but the workpiece may be irradiated with a light obtained by focusing a usual visible ray on a lens or the like.

Furthermore, in the embodiment, the present invention is applied to the NC device having the function of the angle/D value conversion processor in which when the tentative bending angle is key-inputted into the NC console 15, the controller 135 of the NC console 15 converts the tentative bending angle to the corresponding D value. However, the present invention is not limited to this, and can also be applied, for example, to the NC device in which the D value is directly inputted by the operator.

Moreover, the embodiment is constituted such that after the workpiece is bent to the tentative bending angle by the NC device, the target angle is sought, but the present invention is not limited to this constitution, and may be constituted, for example, such that the workpiece is bent to the target angle from the beginning by the NC device. In this case, even when the workpiece bending angle deviates from the target angle, the difference of the bending angle from the bending angle of the workpiece in the unloaded state is obtained, so that the spring-back amount can be obtained.

Moreover, in the embodiment, the present invention is applied to the bending machine provided with the NC device, but is not limited to this, and can also be applied, for example, to a bending machine of a type such that the workpiece is bent by a handle.

Furthermore, in the embodiment, the table raising type press brake has been illustrated as the bending machine, but the present invention can be applied, for example, not only to a table lowering type press brake but also to various bending machines.

Industrial Applicability

The present invention is implemented in the aforementioned modes, and the following effects are produced.

According to the bending angle measuring method of the present invention, the angle detecting head is appropriately movable in the four axial directions and the angle detecting head is positioned in the workpiece angle measurement position before measuring the bending angle. Therefore, the bending angle in the bent portion of the workpiece without any influence of deflection, or the like can be measured, and the workpiece bending angle can be detected with high precision.

On the other hand, according to the bending angle measurement apparatus of the present invention, the angle detecting head is rocked, and moved in the respective X, Y and Z directions. That is to say, since the angle detecting head is movable in the four axial directions, the angle detecting head can be moved and positioned into the vicinity of the bent portion. Even with workpieces which interfere with the angle detecting head, which are bent by acute angles, which have holes, molded materials, and the like, and which are provided with various bent shapes, the angle detecting head can be brought close to the bent portion, and the workpiece bending angle can be detected with high precision.

According to the bending machine of the present invention, since the angle detecting head movable in the four axial directions is disposed on the lower table able to be raised/lowered, immediately after the end of the bending the angle detecting head can be brought close to the workpiece bent portion and positioned in the predetermined angle measurement position to measure the bending angle without detaching the workpiece from the bending machine.

Moreover, according to the present invention, the workpiece bending method comprises the steps of: pressing the workpiece to the vicinity of the target angle by the bending machine; measuring the bending angle of the workpiece during final pressing and holding the measured value; removing the pressure to bring the workpiece to the unloaded state; measuring the bending angle of the workpiece in the unloaded state and holding the measured value; using the final pressing angle measured value and unloaded angle measured value to obtain the angle difference between both the values; and registering the obtained angle difference as the spring-back amount. Therefore, the spring-back amount of the workpiece in the bending process can accurately be measured, further the measured spring-back amount can effectively be utilized, and thereby a workpiece finishing precision can effectively be enhanced.

Furthermore, according to the present invention, the workpiece bending method comprises the steps of: pressing the workpiece to the vicinity of the target angle by the NC device; measuring the bending angle of the workpiece during final pressing and holding the measured value; removing the workpiece from the bending machine to bring the workpiece to the unloaded state; measuring the bending angle of the workpiece in the unloaded state and holding the measured value; using the final pressing angle measured value and unloaded angle measured value to obtain the angle difference between both the values; and registering the obtained angle difference as the spring-back amount. Therefore, the spring-back amount of the workpiece in the bending process can accurately be measured, further the measured spring-back amount can effectively be utilized, and thereby the workpiece finishing precision can effectively be enhanced.

Additionally, according to the present invention, the workpiece bending method comprises: a step of disposing follow-up control means, and setting the target angle in the follow-up control means; a step of setting the D value corresponding the tentative bending angle wider than the target angle in the NC device; a step of pressing the workpiece to bend the workpiece to the vicinity of the tentative bending angle by the NC device; a step of measuring the bending angle of the workpiece during finishing of tentative bending; a follow-up step of transmitting the necessary number of pulses for executing the automatic follow-up operation to the NC device from the follow-up control means based on the angle error between the angle measured value and the target angle, and driving the workpiece to the target angle; a final pressing angle measuring step of measuring the bending angle of the workpiece during final follow-up; a step of removing pressure to bring the workpiece to the unloaded state; an unloaded angle measuring step of measuring the bending angle of the workpiece in the unloaded state; a step of obtaining the spring-back amount of the workpiece from the difference between the final pressing angle measured value and the unloaded angle measured value; and a step of registering the obtained spring-back amount. Therefore, the spring-back amount of the workpiece in the bending process can accurately be measured, further the measured spring-back amount can effectively be utilized, and thereby the workpiece finishing precision can effectively be enhanced.

Moreover, according to the present invention, the workpiece bending method comprises the steps of: disposing follow-up measurement means, and setting the target angle in the follow-up measurement means; setting the D value corresponding to the tentative bending angle wider than the target angle in the NC device; pressing the workpiece to bend the workpiece to the vicinity of the tentative bending angle by the NC device; measuring the bending angle of the workpiece by the follow-up measurement means during the manual follow-up operation of the pulse generator after the tentative bending, and displaying the measured value; holding the measured angle as the final pressing angle measured value by the follow-up measurement means when the angle measured value reaches the target angle; removing pressure to bring the workpiece to the unloaded state, measuring the bending angle of the workpiece in the unloaded state and holding the measured value; using the final pressing angle measured value and unloaded angle measured value to obtain the spring-back amount of the workpiece; and registering the obtained spring-back amount. Therefore, the spring-back amount of the workpiece in the bending process can accurately be measured, further the measured springback amount can effectively be utilized, and thereby the workpiece finishing precision can effectively be enhanced.

Furthermore, according to the present invention, the bending angle controller comprises: operation means to which the target angle is set; pulse generation means for generating the necessary number of pulses for executing the automatic follow-up operation to drive the workpiece to the target angle in the NC device, after bending the workpiece to the vicinity of the tentative bending angle by the NC device to which the D value corresponding to the tentative bending angle wider than the target angle is set; pressing angle measurement means for measuring the angle, when the bending angle of the workpiece reaches the angle corresponding to the target angle by execution of the automatic follow-up operation by the NC device with the pulses transferred from the pulse generation means; unloaded angle measurement means for measuring the bending angle of the workpiece brought to the unloaded state by removing pressure; and control means for obtaining and registering the spring-back amount from the difference between the final pressing angle measured value of the workpiece by the pressing angle measurement means, and the unloaded angle measured value of the workpiece by the unloaded angle measurement means. Therefore, the spring-back amount of the workpiece in the bending process can accurately be measured, further the measured spring-back amount can effectively be utilized, and thereby the workpiece finishing precision can effectively be enhanced.

Additionally, according to the present invention, the bending angle controller comprises: operation means to which the target angle is set; pressing angle measurement means for measuring the bending angle of the workpiece during the manual follow-up operation for operating the pulse generator to drive the workpiece to the target angle, after bending the workpiece to the vicinity of the tentative bending angle by the NC device to which the D value corresponding to the tentative bending angle wider than the target angle is set; means for displaying the angle measured value obtained by the pressing angle measurement means; unloaded angle measurement means for measuring the bending angle of the workpiece brought to the unloaded state by removing pressure after the manual follow-up is finished; and control means for obtaining and registering the spring-back amount from the difference between the final pressing angle measured value obtained by the pressing angle measurement means during finishing of the manual follow-up, and the unloaded angle measured value obtained by the unloaded angle measurement means. Therefore, the spring-back amount of the workpiece in the bending process can accurately be measured, further the measured spring-back amount can effectively be utilized, and thereby the workpiece finishing precision can effectively be enhanced.

Moreover, according to the present invention, the bending angle controller comprises: operation means to which the target angle is set; pulse generation means for automatic follow-up; pressing angle measurement means for measuring the bending angle of the workpiece during the follow-up operation for driving the workpiece to the target angle by the NC device based on the applied pulse, after bending the workpiece to the vicinity of the tentative bending angle by the NC device to which the D value corresponding to the tentative bending angle wider than the target angle is set; unloaded angle measurement means for measuring the bending angle of the workpiece brought to the unloaded state by removing pressure after the follow-up is finished; control means for obtaining and registering the spring-back amount from the difference between the final pressing angle measured value obtained by the pressing angle measurement means during finishing of the follow-up, and the unloaded angle measured value obtained by the unloaded angle measurement means; and changeover means for changing the generation source of the pulse applied to the NC device to the pulse generator or the pulse generation means, the controller being connectable to the NC device via the changeover means. Therefore, the spring-back amount of the workpiece in the bending process can accurately be measured, further the measured spring-back amount can effectively be utilized, and thereby the workpiece finishing precision can effectively be enhanced.

Additionally, since the bending angle controller is connected to the NC device via the changeover means for switching the pulse generator used by the operator for manually driving the workpiece to the target angle, and the pulse generation means used for the automatic follow-up operation, the controller can easily be connected to the existing NC device, and can therefore easily be attached later to the bending machine provided with the existing NC device. As a result, there is an effect that the controller is remarkably preferable as a mountable bending angle controller.

What is claimed is:

1. A workpiece bending method in a bending machine provided with an NC device, the method comprising:

providing a follow-up control system, and setting a target angle in the follow-up control system;

setting a D value corresponding to a tentative bending angle wider than the target angle in the NC device;

pressing the workpiece to bend the workpiece to the vicinity of the tentative bending angle by the NC device;

measuring the bending angle of the workpiece during finishing of tentative bending;

transmitting a number of pulses corresponding to an angle error between an angle measured value and the target angle, to initiate execution of an automatic follow-up operation, to the NC device from the follow-up control system, and driving the workpiece to the target angle;

measuring the bending angle of the workpiece during final follow-up;

removing pressure to bring the workpiece to an unloaded state;

measuring the bending angle of the workpiece in the unloaded state;

obtaining a spring-back amount of the workpiece from a difference between the final pressing angle measured value and the unloaded angle measured angle; and storing the obtained spring-back amount.

2. The workpiece bending method in the bending machine according to claim 1 wherein said transmitting comprises:

converting said angle error to the corresponding D value; and transferring the number of pulses corresponding to the D value to the NC device.

3. The workpiece bending method in the bending machine according to claim 1 wherein said transmitting comprises:

first transferring a predetermined number of pulses as an initial value to the NC device to execute an initial transmit operation;

calculating a necessary number of pulses for executing a remaining transmit operation based on a result of the initial transmit operation; and transferring the calculated number of pulses to the NC device.

4. The workpiece bending method in the bending machine according to claim 1 wherein said transmitting comprises:

converting said angle error to the corresponding D value;

transferring a predetermined number of pulses as an initial value to the NC device to execute an initial follow-up operation;

measuring the bending angle of the workpiece during finishing of the initial follow-up operation;

obtaining the D value per pulse from an angle measured value of a point at which the initial follow-up operation is finished, and the pulse number as the initial value, and obtaining a remaining D value based on the obtained D value; and transferring the number of pulses corresponding to the obtained remaining D value to the NC device and executing a remaining follow-up operation to drive the workpiece to the target angle.

5. The workpiece bending method in the bending machine according to claim 1 wherein while said transmitting operation is being executed, a transmitting operation sound for informing an operator that the transmitting operation is being executed is generated.

6. The workpiece bending method in the bending machine according to claim 1 wherein in measuring the bending angle during final follow-up and in measuring the bending angle in the unloaded state, the measured angle is stored in a memory.

7. The workpiece bending method in the bending machine according to claim 1 wherein, in setting the D value, on inputting the tentative bending angle, the inputted bending angle is converted to the D value.

8. The workpiece bending method in the bending machine according to claim 1 wherein said final pressing angle is measured without contact with the workpiece, and said unloaded angle is measured by contact with the workpiece.

9. A workpiece bending method in a bending machine, the method comprising:

pressing a workpiece to the vicinity of a target angle by a bending machine;

measuring a bending angle of the workpiece during final pressing and storing a measured value;

removing pressure to bring the workpiece to an unloaded state;

measuring the bending angle of the workpiece in the unloaded state and storing the measured value;

using said final pressing angle measured value and said unloaded angle measured value to obtain an angle difference between both the values; and storing the obtained angle difference as a spring-back amount wherein said final pressing angle is measured without contact with the workpiece, and said unloaded angle is measured by contact with the workpiece.

10. A workpiece bending method in a bending machine provided with an NC device, the method comprising:

pressing a workpiece to the vicinity of a target angle by the NC device;

measuring the bending angle of the workpiece during final pressing and storing a measured value;

bringing the workpiece to an unloaded state;

measuring the bending angle of the workpiece in the unloaded state and storing the measured value;

using said final pressing angle measured value and said unloaded angle measured value to obtain an angle difference between both the values; and storing the obtained angle difference as a spring-back amount wherein said final pressing angle is measured without contact with the workpiece, and said unloaded angle is measured by contact with the workpiece.

11. A workpiece bending method in a bending machine provided with an NC device, and a pulse generator for manual follow-up, the method comprising:

providing a follow-up measurement system, and setting a target angle in the follow-up measurement system;

setting a D value corresponding to a tentative bending angle wider than the target angle in the NC device;

pressing the workpiece to bend the workpiece to the vicinity of the tentative bending angle by the NC device;

measuring the bending angle of the workpiece by the follow-up measurement system during a manual follow-up operation of said pulse generator after tentative bending, and displaying a measured value;

storing the measured angle as a final pressing angle measured value by the follow-up measurement system, when the angle measured value reaches the target angle;

removing pressure to bring the workpiece to an unloaded state;

measuring the bending angle of the workpiece in the unloaded state and storing the measured value;

using said final pressing angle measured value and said unloaded angle measured value to obtain a spring-back amount of the workpiece; and registering the obtained spring-back amount.

12. The workpiece bending method in the bending machine according to claim 11 wherein when the angle measured value reaches the target angle by execution of said manual follow-up operation, a follow-up end sound for informing an operator that the angle measured value reaches the target angle is generated.

13. The workpiece bending method in the bending machine according to claim 11 wherein in setting the D value, on inputting the tentative bending angle, the inputted tentative bending angle is converted to the D value.

14. The workpiece bending method in the bending machine according to claim 11 wherein said final pressing angle is measured without contact with the workpiece, and said unloaded angle is measured by contact with the workpiece.

15. A bending angle controller in a bending machine provided with an NC device, the controller comprising:

an operation system to which a target angle is set;

a pulse generation system for generating a number of pulses corresponding to an angle error between an angle measured value and the target angle, to initiate execution of an automatic follow-up operation to drive the workpiece to the target angle in the NC device, after bending the workpiece to the vicinity of a tentative bending angle by the NC device to which a D value corresponding to the tentative bending angle wider than the target angle is set;

a pressing angle measurement system for measuring an angle, when the bending angle of the workpiece reaches the angle corresponding to the target angle by execution of an automatic follow-up operation by the NC device based on the pulses transferred from the pulse generation system;

an unloaded angle measurement system for measuring the bending angle of the workpiece brought to an unloaded state by removing pressure; and a control system for obtaining, and registering a springback amount from a difference between a final pressing angle measured value of the workpiece by said pressing angle measurement system, and an unloaded angle measured value of the workpiece by said unloaded-angle measurement system.

16. The bending angle controller in the bending machine according to claim 15 wherein said pressing angle measurement system measures the bending angle of the workpiece during finishing of tentative bending by the NC device, and said control system allows said pulse generation system to generate the number of pulses for allowing the NC device to execute the automatic follow-up operation based on the angle error.

17. The bending angle controller in the bending machine according to claim 16 wherein said control system converts said angle error to the corresponding D value, and allows said pulse generation system to generate the number of pulses corresponding to the D value.

18. The bending angle controller in the bending machine according to claim 16 wherein said control system first allows said pulse generation system to generate a predetermined number of pulses as an initial value, allows the NC device to execute an initial follow-up operation, calculates a necessary number of pulses for executing a remaining follow-up operation based on a result of the initial follow-up operation, and allows said pulse generation system to transfer the calculated number of pulses.

19. The bending angle controller in the bending machine according to claim 15 wherein said bending angle controller can be connected to the NC device via a path for transferring the pulses to the NC device from said pulse generation system.

20. The bending angle controller in the bending machine according to claim 15 wherein said pressing angle measurement system measures the pressing angle in non-contact with the workpiece, and the unloaded angle measurement system measures the unloaded angle in contact with the workpiece.

21. A bending angle controller in a bending machine provided with an NC device and a pulse generator for manual follow-up, the controller comprising:

an operation system to which a target angle is set;

a pressing angle measurement system for measuring a bending angle of a workpiece during a manual follow-up operation for operating said pulse generator to drive the workpiece to the target angle, after bending the workpiece to the vicinity of a tentative bending angle by the NC device to which a D value corresponding to the tentative bending angle wider than the target angle is set;

a system for displaying an angle measured value obtained by the pressing angle measurement system;

an unloaded angle measurement system for measuring the bending angle of the workpiece brought to an unloaded state by removing pressure, after the manual follow-up is finished; and a control system for obtaining and registering a springback amount from a difference between a final pressing angle measured value obtained by said pressing angle measurement system during finishing, of the manual follow-up, and an unloaded angle measured value obtained by said unloaded angle measurement system.

22. The bending angle controller in the bending machine according to claim 21 wherein said pressing angle measurement system measures the pressing angle in non-contact with the workpiece, and the unloaded angle measurement system measures the unloaded angle in contact with the workpiece.

23. A bending angle controller in a bending machine provided with an NC device and a pulse generator for manual follow-up, the controller comprising:

an operation system to which a target angle is set;

a pulse generation system for automatic follow-up;

a pressing angle measurement system for measuring a bending angle of a workpiece during a follow-up operation for driving the workpiece to the target angle by the NC device based on an applied pulse, after bending the workpiece to the vicinity of a tentative bending angle by the NC device to which a D value corresponding to the tentative bending angle wider than the target angle is set;

an unloaded angle measurement system for measuring the bending angle of the workpiece brought to an unloaded state by removing pressure, after the follow-up is finished;

a control system for obtaining and registering a springback amount from a difference between a final pressing angle measured value obtained by said pressing angle measurement during finishing of the follow-up, and an unloaded angle measured value obtained by said unloaded angle measurement; and a changeover system for changing a generation source of the pulse to be applied to the NC device to said pulse generator or said pulse generation system, said bending angle controller being connectable to the NC device via the changeover system.

24. The bending angle controller in the bending machine according to claim 23 wherein when said changeover system is in a state for selecting said pulse generation system, said control system allows the pulse generation system to generate a number of pulses for allowing the NC device to execute the automatic follow-up operation based on an angle error between the angle measured value obtained by said pressing angle measurement system during finishing of tentative bending and the target angle.

25. The bending angle controller in the bending machine according to claim 23, further comprising: a system for displaying the angle measured value obtained by said pressing angle measurement system, when said changeover system is in a state for selecting said pulse generator.

26. The bending angle controller in the bending machine according to claim 23 wherein said pressing angle measurement system measures the pressing angle in non-contact with the workpiece, and the unloaded angle measurement system measures the unloaded angle in contact with the workpiece.

* * * * *

UNITED STATES PATENT AND TRADEMARK OFFICE
CERTIFICATE OF CORRECTION

PATENT NO.   : 6,708,541 B1
DATED        : March 23, 2004
INVENTOR(S)  : M. Matsumoto et al.

It is certified that error appears in the above-identified patent and that said Letters Patent is hereby corrected as shown below:

Column 29,
Line 6, after "obtaining" delete -- , --.

Signed and Sealed this

Fourth Day of January, 2005

JON W. DUDAS
*Director of the United States Patent and Trademark Office*